United States Patent
Hirai et al.

(10) Patent No.: US 12,017,768 B2
(45) Date of Patent: Jun. 25, 2024

(54) INFORMATION PROCESSING APPARATUS AND INFORMATION PROCESSING METHOD

(71) Applicant: SONY GROUP CORPORATION, Tokyo (JP)

(72) Inventors: Michiro Hirai, Tokyo (JP); Hiroaki Nishimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 60 days.

(21) Appl. No.: 17/593,325

(22) PCT Filed: Mar. 13, 2020

(86) PCT No.: PCT/JP2020/011053
§ 371 (c)(1),
(2) Date: Sep. 15, 2021

(87) PCT Pub. No.: WO2020/195933
PCT Pub. Date: Oct. 1, 2020

(65) Prior Publication Data
US 2022/0185472 A1    Jun. 16, 2022

(30) Foreign Application Priority Data
Mar. 27, 2019 (JP) .................. 2019-059817

(51) Int. Cl.
*B64C 39/02* (2023.01)
*G05D 1/00* (2006.01)
*B64U 101/30* (2023.01)

(52) U.S. Cl.
CPC .......... *B64C 39/024* (2013.01); *G05D 1/0011* (2013.01); *G05D 1/0094* (2013.01);
(Continued)

(58) Field of Classification Search
CPC .. B64C 39/024; G05D 1/0011; G05D 1/0094; G05D 1/101; B64U 2201/10; B64U 2201/20; B64U 2101/30
See application file for complete search history.

(56) References Cited

U.S. PATENT DOCUMENTS 6,856,803 B1 * 2/2005 Gross ................. H04B 7/18506
455/431
8,418,959 B2 * 4/2013 Kang .................... B64C 39/024
244/116
(Continued)

FOREIGN PATENT DOCUMENTS

CN    104954668 A    9/2015
CN    105517664 A    4/2016
(Continued)

OTHER PUBLICATIONS

International Search Report and Written Opinion of PCT Application No. PCT/JP2020/011053, dated Jun. 9, 2020, 11 pages of ISRWO.

(Continued)

*Primary Examiner* — Hussein Elchanti
(74) *Attorney, Agent, or Firm* — CHIP LAW GROUP

(57) ABSTRACT

The present disclosure relates to an information processing apparatus and information processing method of more easily capturing image in accordance with more various situations. An imaging device including an imaging function unit and an imaging range variable unit is controlled on the basis of vehicle information that is information regarding a vehicle. For example, on the basis of vehicle information obtained in a patrol car, such as vehicle location and position information, vehicle speed information, vehicle operation information, or vehicle attached equipment information, imaging of a subject by the imaging device provided to a flying body and flight by the flying body are controlled. The present
(Continued)

disclosure can be applied to, for example, an information processing apparatus, an image processing apparatus, a communication apparatus, an electronic device, an information processing method, or the like.

16 Claims, 16 Drawing Sheets

(52) U.S. Cl.
CPC ......... G05D 1/101 (2013.01); *B64U 2101/30* (2023.01); *B64U 2201/10* (2023.01); *B64U 2201/20* (2023.01)

(56) References Cited

U.S. PATENT DOCUMENTS

| | | | | |
|---|---|---|---|---|
| 8,798,830 | B2 * | 8/2014 | Sobue | B60L 15/2045 701/22 |
| 8,897,770 | B1 * | 11/2014 | Frolov | H04W 84/06 455/13.1 |
| 9,056,676 | B1 * | 6/2015 | Wang | B64F 1/222 |
| 9,083,425 | B1 * | 7/2015 | Frolov | G05D 1/104 |
| 9,139,310 | B1 * | 9/2015 | Wang | B64F 1/007 |
| 9,513,629 | B1 * | 12/2016 | Thörn | G05D 1/0094 |
| 9,896,203 | B1 * | 2/2018 | Kim | B64C 39/024 |
| 9,964,951 | B1 * | 5/2018 | Dunn | G06T 7/70 |
| 10,023,326 | B2 * | 7/2018 | Byers | B64F 5/60 |
| 10,053,217 | B2 * | 8/2018 | Cho | B64C 39/024 |
| 10,209,707 | B2 * | 2/2019 | Matuszeski | G05D 1/0016 |
| 10,322,820 | B2 * | 6/2019 | Husain | B64C 39/024 |
| 10,370,102 | B2 * | 8/2019 | Boykin | H04N 21/435 |
| 10,373,097 | B2 * | 8/2019 | Kulkarni | G08G 5/0021 |
| 10,434,885 | B2 * | 10/2019 | Antonini | B64C 39/024 |
| 10,553,122 | B1 * | 2/2020 | Gilboa-Amir | G08G 5/0013 |
| 10,604,020 | B2 * | 3/2020 | Ricci | B60C 19/00 |
| 2009/0157233 | A1 | 6/2009 | Kokkeby et al. | |
| 2011/0231217 | A1 * | 9/2011 | Hand | G06Q 50/28 707/E17.108 |
| 2014/0208371 | A1 * | 7/2014 | Mori | H04N 21/47217 725/77 |
| 2014/0319272 | A1 * | 10/2014 | Casado Magana | B60L 50/52 244/110 E |
| 2015/0281587 | A1 | 10/2015 | Furuta et al. | |
| 2015/0336668 | A1 * | 11/2015 | Pasko | G05D 1/00 701/2 |
| 2015/0336669 | A1 * | 11/2015 | Kantor | G01C 21/3415 701/3 |
| 2015/0336671 | A1 * | 11/2015 | Winn | B64C 39/024 701/3 |
| 2015/0339933 | A1 * | 11/2015 | Batla | G08G 5/0082 701/120 |
| 2015/0353206 | A1 | 12/2015 | Wang | |
| 2015/0379874 | A1 * | 12/2015 | Ubhi | H04B 7/18506 701/3 |
| 2016/0001883 | A1 * | 1/2016 | Sanz | H02J 7/0042 244/17.23 |
| 2016/0023762 | A1 | 1/2016 | Wang | |
| 2016/0046387 | A1 * | 2/2016 | Frolov | B64B 1/00 244/59 |
| 2016/0050011 | A1 * | 2/2016 | Frolov | H04B 7/18506 455/431 |
| 2016/0050012 | A1 * | 2/2016 | Frolov | H04B 7/18504 455/431 |
| 2016/0124431 | A1 * | 5/2016 | Kelso | G06K 19/06037 701/28 |
| 2017/0220041 | A1 | 8/2017 | Tanaka et al. | |
| 2017/0301109 | A1 * | 10/2017 | Chan | G06V 20/17 |
| 2018/0032077 | A1 | 2/2018 | Moon et al. | |
| 2018/0101173 | A1 * | 4/2018 | Banerjee | G06T 7/70 |
| 2018/0364740 | A1 * | 12/2018 | Collins | G06V 20/176 |

FOREIGN PATENT DOCUMENTS

| | | |
|---|---|---|
| EP | 2930658 A1 | 10/2015 |
| EP | 3246776 A1 | 11/2017 |
| JP | 2010-118935 A | 5/2010 |
| JP | 2015-195569 A | 11/2015 |
| JP | 2016-535879 A | 11/2016 |
| JP | 2017-010445 A | 1/2017 |
| JP | 2017-011614 A | 1/2017 |
| JP | 2017-021757 A | 1/2017 |
| JP | 2017-112438 A | 6/2017 |
| JP | 2017-199172 A | 11/2017 |
| JP | 2017-227946 A | 12/2017 |
| WO | 2015/180180 A1 | 12/2015 |

OTHER PUBLICATIONS

Extended European Search Report of EP Application No. 20779326.6, dated Mar. 17, 2022, 09 pages.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/011053 filed on Mar. 13, 2020, which claims priority benefit of Japanese Patent Application No. JP 2019-059817 filed in the Japan Patent Office on Mar. 27, 2019. Each of the above-referenced applications is hereby incorporated herein by reference in its entirety.

TECHNICAL FIELD

The present disclosure relates to an information processing apparatus and method and a program, and particularly relates to an information processing apparatus and method and a program capable of more easily capturing image in accordance with more various situations.

BACKGROUND ART

In recent years, various systems utilizing a flying body such as a so-called drone have been studied. For example, a method of causing a flying body to fly in a parking lot and guiding a user to a specific location has been conceived (see, for example, Patent Document 1).

Furthermore, for example, it has been conceived to support patrol, such as imaging by using an imaging device during patrol of a police officer, and recording and guidance by using a captured image.

CITATION LIST

Patent Document

Patent Document 1: Japanese Patent Application Laid-Open No. 2017-227946

SUMMARY OF THE INVENTION

Problems to be Solved by the Invention

In such patrol, various situations occur. Therefore, in order to appropriately support patrol, it is required to perform imaging according to each situation. However, there has been no method of performing such imaging according to various situations, and it has been difficult to appropriately support patrol in more situations. Even with the method described in Patent Document 1, it is possible to guide a user to a specific location by causing the flying body to fly, but it has been difficult to perform imaging according to the situation.

The present disclosure has been made in view of such a situation, and an object thereof is to enable an imaging device to more easily perform imaging according to more various situations.

Solutions to Problems

An information processing apparatus according to one aspect of the present technology is an information processing apparatus including a control unit configured to control an imaging device, on the basis of vehicle information that is information regarding a vehicle.

An information processing method according to one aspect of the present technology is an information processing method for controlling an imaging device, on the basis of vehicle information that is information regarding a vehicle.

A program according to one aspect of the present technology is a program for causing a computer to function as a control unit configured to control an imaging device, on the basis of vehicle information that is information regarding a vehicle.

In the information processing apparatus and method and the program according to one aspect of the present technology, the imaging device is controlled on the basis of vehicle information that is information regarding a vehicle.

MODE FOR CARRYING OUT THE INVENTION

Figure 1:
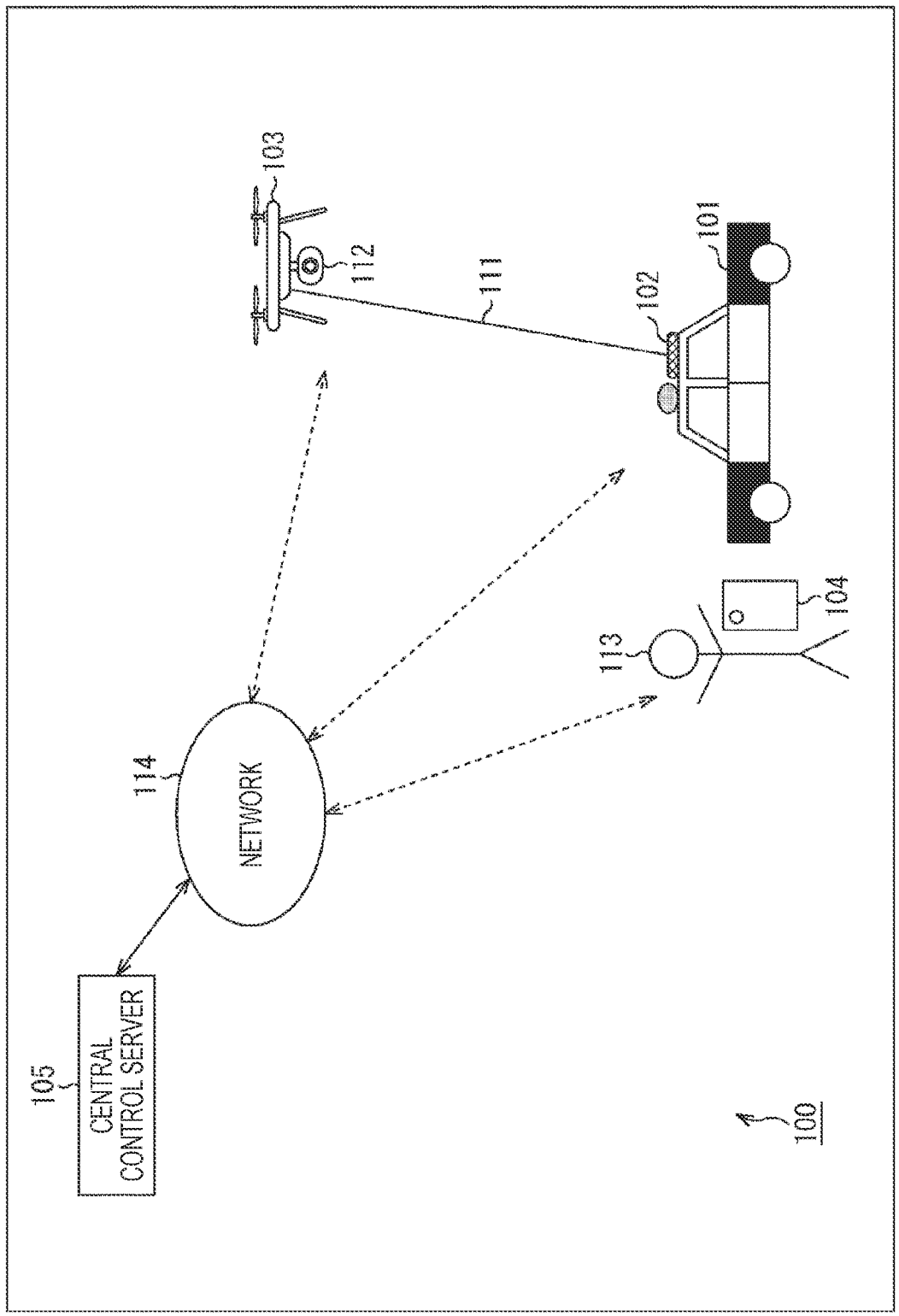
FIG. 1 is a view showing a main configuration example of a patrol support system.

Hereinafter, an embodiment for implementing the present disclosure (hereinafter, referred to as an embodiment) will be described. Note that the description will be given in the following order.

1. First embodiment (patrol support system)
2. Use case 1-1
3. Use case 1-2
4. Use case 2
5. Use case 3
6. Use case 4
7. Supplementary note

1. FIRST EMBODIMENT

<Imaging Control Based on Vehicle Information>

In recent years, for example, as described in Patent Document 1, various systems utilizing a flying body such as a so-called drone have been studied. For example, a method of causing a flying body to fly in a parking lot and guiding a user to a specific location has been conceived.

Furthermore, for example, it has been conceived to support patrol, such as imaging by using an imaging device during patrol of a police officer, and recording and guidance by using a captured image. In such patrol, various situations occur. Therefore, in order to appropriately support patrol, it is required to perform imaging according to each situation.

However, there has been no method of performing such imaging according to various situations, and it has been difficult to appropriately support patrol in more situations. Even with the method described in Patent Document 1, it is possible to guide a user to a specific location by causing the flying body to fly, but it has been difficult to perform imaging according to the situation.

For example, a method is conceivable in which a flying body having an imaging device is mounted on a patrol car, the flying body is caused to fly during patrol to capture an image from the sky, and recording and guidance are performed using the captured image. However, it has been difficult to cause the flying body to fly and to perform imaging while the patrol car is traveling. Furthermore, there are a situation in which imaging is necessary and a situation in which imaging is unnecessary even during patrol, and imaging is unnecessary when not being on patrol. However, it has been difficult to identify each situation and perform imaging in an appropriate situation. Furthermore, there are a case where a police officer should be imaged, a case where surroundings of a patrol car should be imaged, and the like depending on the situation. However, it has been difficult to appropriately determine what is to be a subject and how to capture an image. For example, it is conceivable that an operator manually operates the flying body or the imaging device in accordance with the situation, but in that case, complicated work has been required.

Therefore, an imaging device including an imaging function unit and an imaging range variable unit is to be controlled on the basis of vehicle information that is information regarding a vehicle. For example, an information processing apparatus includes a control unit configured to control an imaging device, on the basis of vehicle information that is information regarding a vehicle. Furthermore, for example, a program causes a computer to function as a control unit configured to control an imaging device, on the basis of vehicle information that is information regarding a vehicle. Doing in such a way enables imaging according to more various situations to be more easily performed.

<Patrol Support System>

FIG. 1 is a block diagram showing an example of a main configuration of a patrol support system, which is one aspect of an information processing system to which the present technology is applied. A patrol support system 100 shown in FIG. 1 is a system that performs imaging and supports patrol of a police officer by using an obtained captured image. As shown in FIG. 1, the patrol support system 100 includes a patrol car 101, a base station 102, a flying body 103, a terminal device 104, and a central control server 105.

The patrol car 101 is a vehicle on which the police officer 113 rides, and an operation such as driving is performed by the police officer 113. The patrol car 101 also has equipment specific to a police vehicle, such as, for example, a rotating light (also referred to as a red light or a light bar) and a wireless communication device, in addition to a function as a normal vehicle. Furthermore, the patrol car 101 includes the base station 102.

The base station 102 is a control device configured to control the flying body 103, and is a device serving as a take-off and landing site of the flying body 103. The base station 102 and the flying body 103 are connected to each other by a cable 111 in order to physically limit a flight range of the flying body 103. Furthermore, the base station 102 has a communication function, and can communicate with another device such as the patrol car 101, the flying body 103, the terminal device 104, or the central control server 105. Any method (standard) may be adopted for the communication of these, and wireless communication, wired communication, or both may be adopted. For example, the base station 102 and the flying body 103 may perform communication via the cable 111 (perform wired communication), or may perform wireless communication without the cable 111. Note that, for example, the base station 102 may be able to wind the cable 111 such that the cable 111 is not loosened. In other words, a length of the cable 111 may be variable, and a flight restriction range of the flying body 103 may be variable.

The flying body 103 is an unmanned aircraft such as a so-called drone. The flying body 103 uses the base station 102 as a take-off and landing site, and flies within the flight restriction range by the cable 111. The flying body 103 can fly autonomously or can fly (by being remotely operated) under control of another device such as the base station 102.

Furthermore, the flying body 103 includes a camera 112 and has an imaging function. For example, the flying body 103 can capture an image by using the camera 112 (imaging function unit) while flying. That is, the flying body 103 is an imaging range variable unit that makes an imaging range of the camera 112 variable (controls the imaging range). This imaging can be performed autonomously, or can be controlled by another device such as the base station 102. While flying, the flying body 103 captures an image of surroundings of the patrol car 101, the police officer 113, and the like during patrol, in accordance with the situation. The captured image can be used for any purpose. For example, this captured image may be used to control any other device such as the patrol car 101, the flying body 103, and the terminal device 104. Furthermore, for example, this captured image may be used for support of patrol activities such as recording and guidance.

In other words, the camera 112 includes the flying body 103 and has a flight function. That is, the flying body 103 and the camera 112 can be said to be a flying body (aircraft) including the imaging function unit and the imaging range varying unit, and can also be said to be an imaging device including the imaging function unit and the imaging range variable unit.

The terminal device 104 is an electronic device carried by the police officer 113 who is a user (a driver, a crew) of the patrol car 101. For example, the terminal device 104 may be a portable terminal device such as a smartphone or a tablet device. Furthermore, for example, the terminal device 104 may be a wearable device of a wristwatch type, a spectacle type, a ring type, a shoe type, a pocket type, a pendant type, or the like. The terminal device 104 has an imaging function such as a camera, and can capture an image of a subject. The police officer 113 during patrol basically carries this terminal device 104, and the terminal device 104 captures an image of a situation around the police officer 113. This captured image can be used for any purpose. For example, this captured image may be used to control any other device such as the patrol car 101 or the flying body 103.

Note that the terminal device 104 may include any sensor so as to be able to detect information regarding the police officer 113. For example, the terminal device 104 may be able to detect use of a weapon or a tool by the police officer 113, biological information of the police officer 113 such as a pulse, a heart rate, and a line-of-sight direction, and the like by the sensor. The detected information (sensor information) can be used for any purpose. For example, this sensor information may be used to control any other device such as the patrol car 101 or the flying body 103.

The central control server 105 is a server that manages the patrol support system 100. The patrol car 101 to the terminal device 104 described above are devices (local devices) on a terminal side in the patrol support system 100. On the other hand, the central control server 105 is a server-side device, and manages and controls, for example, the patrol car 101 to the terminal device 104.

The central control server 105 may have any configuration, and may be, for example, an information processing apparatus provided in a central management facility such as a control center, or may be an information processing apparatus whose configuration is not specified like a so-called cloud server.

The central control server 105 is communicably connected to the base station 102 via a network 114, and communicates with the base station 102 to control the base station 102, acquire information from the base station 102, and communicate with other devices via the base station 102. Of course, the central control server 105 may be communicably connected to the patrol car 101, the flying body 103, and the terminal device 104 via the network 114, to be able to communicate with these devices without via the base station 102. Note that any method (standard) may be adopted for this communication, and wireless communication, wired communication, or both may be adopted.

The network 114 is any network such as, for example, the Internet or a local area network. The network 114 includes one or a plurality of networks configured in a wired or wireless manner or in both manners. The patrol car 101 to the terminal device 104 are connected to the network 114 by, for example, wireless communication. Furthermore, the central control server 105 is connected to the network 114 by wired communication, wireless communication, or both.

Note that, FIG. 1 shows one each of the patrol car 101 to the central control server 105, but any number of individual devices may be included in the patrol support system 100. The number of the individual devices may be singular or plural. Furthermore, the number of the individual devices may not be the same.

For example, a plurality of base stations 102 may be provided for one patrol car 101. Furthermore, for example, a plurality of flying bodies 103 may be provided for one base station 102. That is, the plurality of flying bodies 103 may use the same base station 102 as a take-off and landing site. In other words, one base station 102 may be able to control a plurality of flying bodies 103.

Furthermore, a plurality of terminal devices 104 may be provided for one patrol car 101. For example, a plurality of police officers 113 may be crews in one patrol car 101, and each of the plurality of police officers 113 may carry the terminal device 104. Furthermore, one police officer 113 may carry a plurality of terminal devices 104.

Furthermore, a plurality of local devices may be provided for one central control server 105. That is, a plurality of patrol cars 101 (and the base stations 102 and the terminal devices 104) may be provided for one central control server 105. In that case, the central control server 105 communicates with the base station 102 of each patrol car 101, or another local device. Furthermore, a plurality of central control servers 105 may be provided in the patrol support system 100. In this case, the central control servers 105 each may communicate with mutually different local devices, or a plurality of central control servers 105 may communicate with mutually the same local device. Furthermore, a plurality of central control servers 105 may share a plurality of processes or perform one process in cooperation.

<Support Contents>

Next, contents of support performed by the patrol support system 100 will be described. The patrol support system 100 can perform any process related to patrol support. For example, the patrol support system 100 can perform: collecting and recording of information about a surrounding environment; warning (detection of an occurrence of abnormality or a suspicious person, and the like); information notification to the police officer 113 (notification of investigation information, warning when danger occurs, guidance, and the like); and monitoring and recording of a behavior of the police officer 113.

<Vehicle Information>

Figure 2:
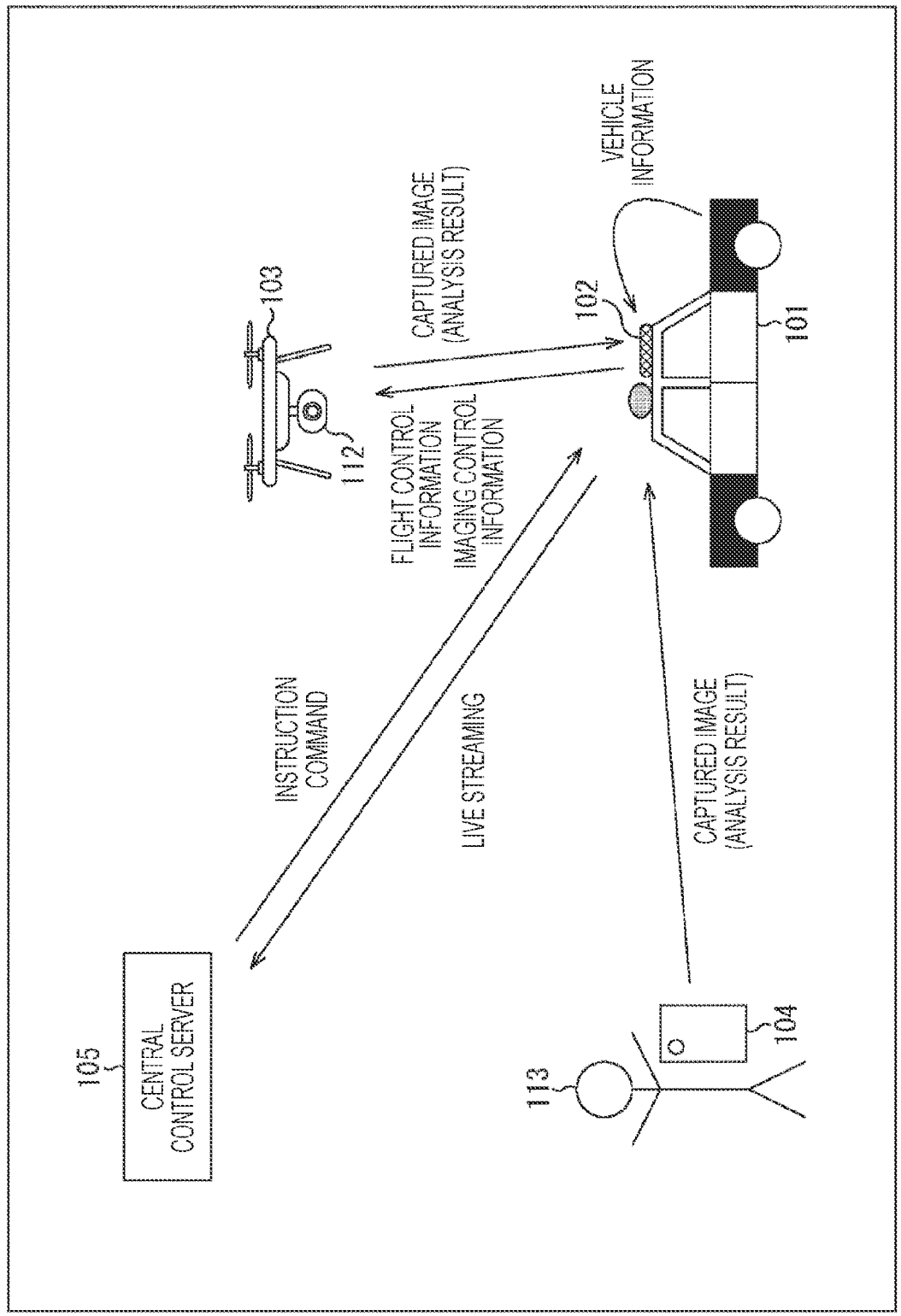
FIG. 2 is a view showing an example of data exchanged between devices.

Next, information exchanged between the individual devices described above will be described with reference to FIG. 2. As shown in FIG. 2, the patrol car 101 supplies vehicle information to the base station 102.

<Vehicle Location and Position Information>

Vehicle information is information regarding a vehicle (the patrol car 101), and may have any content as long as it relates to the vehicle. For example, the vehicle information may include vehicle location and position information that is information regarding a location and a position of the vehicle. The vehicle location and position information may have any content as long as it relates to a location and a position of the vehicle.

For example, the vehicle location and position information may include information indicating a location of the patrol car 101 measured by receiving a signal transmitted from a global positioning system (GPS) satellite or the like. Furthermore, the vehicle location and position information may include information indicating a location and an orientation (position) of the patrol car 101 measured using an angular velocity sensor (also referred to as a gyroscope or a gyroscope sensor). Moreover, the vehicle location and position information may include information indicating a location and an orientation (position) of the patrol car 101 that are derived on the basis of an operation (driving action) of an accelerator, a brake, a steering wheel, or the like.

<Vehicle Speed Information>

Furthermore, for example, the vehicle information may include vehicle speed information that is information regarding a speed of the vehicle. The vehicle speed information may have any content as long as it relates to a speed of the vehicle.

For example, the vehicle speed information may include information (information derived from an angular velocity of a wheel or the like) indicating a speed of the patrol car 101 measured by a speedometer of the patrol car 101. Furthermore, the vehicle speed information may include information indicating a speed of the patrol car 101 measured using an angular velocity sensor (also referred to as a gyroscope or a gyroscope sensor).

<Vehicle Operation Information>

Moreover, for example, the vehicle information may include vehicle operation information that is information regarding an operation on the vehicle (an operation on equipment as a vehicle) by a user (a driver or the like). The vehicle operation information may have any content as long as it relates to an operation on the vehicle. For example, the vehicle operation information may include information indicating a state of an engine (that is, whether or not the engine is driven, and the like) (or information indicating a state (ON/OFF/ACC (accessory power supply) or the like) of an ignition key (engine key)) of the patrol car 101.

Furthermore, the vehicle operation information may include information indicating an open/closed state of a door of the patrol car 101. Moreover, the vehicle operation information may include information indicating an accelerator opening degree (throttle opening degree) of the patrol car 101. Furthermore, the vehicle operation information may include information indicating a state (operation status) of a brake pedal, a parking brake, or the like of the patrol car 101. Moreover, the vehicle operation information may include information indicating a state (operation status) of a steering wheel, a shift lever, or the like.

Furthermore, the vehicle operation information may include information indicating a state of a direction indicator, a wiper, or the like (or information indicating an operation status of switches (operation units) of these) of the patrol car 101. Moreover, the vehicle operation information may include information indicating a state (turning on/off or the like) of lighting (or information indicating an operation status of a light switch (operation unit)) of the patrol car 101. Of course, the vehicle operation information may include information indicating other operations on the equipment as a vehicle, of the patrol car 101.

<Vehicle Attached Equipment Information>

Moreover, for example, the vehicle information may include vehicle attached equipment information that is information regarding attached equipment of the vehicle. The vehicle attached equipment information may have any content as long as it relates to the attached equipment of the vehicle. For example, the vehicle attached equipment information may include information regarding equipment installed in the patrol car 101. Furthermore, the equipment may be the attached equipment as a police vehicle. That is, the vehicle attached equipment information may include information (police equipment information) regarding the attached equipment as the police vehicle.

For example, the vehicle attached equipment information may include information indicating a state (turning on/off or the like) of a rotating light (a red light or a light bar) (or information indicating an operation status of an operation unit of the rotating lamp) of the patrol car 101. Furthermore, the vehicle attached equipment information may include information indicating a usage status (not in use, in use, recently used, or the like) of a siren and a loudspeaker (or information indicating an operation status of an operation unit of the siren or the loudspeaker) of the patrol car 101. Moreover, the vehicle attached equipment information may include information indicating a usage status (not in use, in use, recently used, or the like) of a wireless communication device (or information indicating an operation status of an operation unit of the wireless communication device) of the patrol car 101.

Furthermore, the vehicle attached equipment information may include information indicating a usage status (whether or not being taken out from the patrol car 101, or the like) of equipment attachable to and detachable from the patrol car 101. For example, a usage status (whether or not being removed from a predetermined position, and the like) of a weapon (a gun, a baton, or the like), a tool (a flashlight, a sign, and the like), and the like installed at the predetermined location (for example, a trunk room, or the like) of the patrol car 101, and a detection result may be detected by a sensor or the like and included in the vehicle attached equipment information.

Of course, the patrol car 101 can supply any information other than the vehicle information, to the base station 102.

<Environment Information (Flying Body)>

Furthermore, as shown in FIG. 2, the flying body 103 may supply a captured image generated by imaging by the camera 112 to the base station 102, as environment information. For example, the camera 112 may capture an image of surroundings of the patrol car 101 and the police officer 113 to generate a captured image (also referred to as a flying body captured image), and the flying body 103 may supply the flying body captured image to the base station 102, as environment information that is information regarding the surroundings of the patrol car 101. Note that, the camera 112 (or the flying body 103) may analyze the flying body captured image for a desired matter, and the flying body 103 may supply an analysis result to the base station 102 as the environment information instead of the flying body captured image.

Note that, the flying body 103 may collect sound around the patrol car 101 and the police officer 113 by using a microphone (not illustrated) or the like, and supply sound information to the base station 102 as the environment information.

Of course, the flying body 103 (camera 112) can supply any information other than the environment information, to the base station 102.

<Environment Information (Terminal Device)>

Furthermore, as shown in FIG. 2, the terminal device 104 may supply, as the environment information, a captured image generated by imaging by the terminal device 104 (another device different from the camera 112), to the base station 102. For example, the terminal device 104 may capture an image of surroundings of the police officer 113 to generate a captured image (also referred to as a terminal captured image), and supply the terminal captured image to the base station 102 as the environment information. Note that the terminal device 104 may analyze the terminal captured image for a desired matter, and supply an analysis result to the base station 102 as the environment information, instead of the terminal captured image.

Note that, the terminal device 104 collects sound around the terminal device 104 (that is, sound around the police officer 113), and supply sound information to the base station 102 as the environment information.

Furthermore, the terminal device 104 may detect use of a weapon by the police officer 113, a predetermined behavior by the police officer 113, biological information of the police officer 113, and the like by using a sensor and the like, and supply the detected information to the base station 102 as the environment information.

Of course, the terminal device 104 can supply any information other than the environment information, to the base station 102.

<Instruction Command>

Furthermore, as shown in FIG. 2, the central control server 105 may supply, as the environment information, an instruction command generated in the central control server 105, to the base station 102. The instruction command may have any content. For example, an instruction command (control information) for the base station 102 may be included, an instruction command (control information) for the flying body 103 (or the camera 112) may be included, an instruction command (control information) for the patrol car 101 may be included, and an instruction command (control information) for the terminal device 104 (or the police officer 113) may be included.

Of course, the central control server 105 can supply any information other than the instruction command, to the base station 102.

<Imaging Control Information>

Furthermore, as shown in FIG. 2, the base station 102 supplies imaging control information for controlling imaging of a subject by the camera 112, to the flying body 103 (camera 112). The base station 102 generates this imaging control information on the basis of the vehicle information supplied from the patrol car 101. The flying body 103 (camera 112) captures an image of a subject with the camera 112 on the basis of this imaging control information. That is, the base station 102 controls imaging of a subject by the camera 112 on the basis of the vehicle information.

Note that the base station 102 may generate the imaging control information further on the basis of environment information supplied from another device. That is, the base station 102 may control imaging of a subject by the camera 112 on the basis of the vehicle information and the environment information.

The imaging control information may have any content as long as it relates to control of imaging by the camera 112. For example, the imaging control information may include information instructing an angle of view (zoom (a wide angle/a narrow angle), pan, tilt, and the like) of imaging. Moreover, the imaging control information may include information instructing a start or an end of imaging. Furthermore, the imaging control information may include information instructing a start or an end of streaming distribution of a captured image generated by imaging. That is, on the basis of the vehicle information (or the vehicle information and the environment information), the base station 102 may control a direction of imaging, an angle of view of the imaging, a start or an end of the imaging by the camera 112, or a start or an end of transmission (for example, streaming distribution or the like) of a captured image generated by imaging.

Of course, the imaging control information may include information other than these. For example, the imaging control information may include information instructing exposure, information instructing a depth of field, information instructing sensitivity, information instructing resolution, information instructing image processing (such as white balance adjustment and filter processing) on the generated captured image, and the like.

In this way, by controlling the imaging of a subject by the camera 112 on the basis of the vehicle information, it is possible to more easily perform imaging according to more various situations.

<Flight Control Information>

Furthermore, as shown in FIG. 2, the base station 102 supplies flight control information for controlling flight of the flying body 103, to the flying body 103. The base station 102 generates this flight control information on the basis of the vehicle information supplied from the patrol car 101. The flying body 103 flies in the air on the basis of this flight control information. This flight allows the flying body 103 to move the camera 112 and control a position of the camera 112. That is, the base station 102 controls the flight by the flying body 103 on the basis of the vehicle information.

Note that the base station 102 may generate the flight control information further on the basis of environment information supplied from another device. That is, the base station 102 may control flight by the flying body 103 on the basis of the vehicle information and the environment information.

The flight control information may have any content as long as it relates to flight by the flying body 103. For example, the flight control information may include information instructing a location of the flying body 103. Furthermore, the flight control information may include information instructing a height of the flying body 103 (a flight altitude of the flying body 103). Moreover, the flight control information may include information instructing an orientation of the flying body. Furthermore, the flight control information may include information instructing an inclination of the flying body. Moreover, the flight control information may include information instructing a motion of the flying body (such as a flight speed, a flight path, take-off, landing, a flight mode (surrounding monitoring, tracking, and the like)). Of course, the flight control information may include information other than these. For example, information for controlling a rotation speed or the like of a propeller may be included.

By controlling flight by the flying body 103 on the basis of the vehicle information in this way, it is possible to more easily perform imaging according to more various situations by the camera 112 provided to the flying body 103.

Of course, the base station 102 can supply any information other than the imaging control information and the flight control information, to the flying body 103 (camera 112).

<Vehicle Control Information>

Furthermore, although not illustrated, the base station 102 may supply vehicle control information for controlling the patrol car 101 (vehicle), to the patrol car 101. In this case, the base station 102 generates this vehicle control information on the basis of the vehicle information, or on the basis of the vehicle information and the environment information. On the basis of this vehicle control information, the patrol car 101 drives the patrol car 101, equipment mounted on the patrol car 101, and the like. That is, the base station 102 may control the patrol car 101 on the basis of the vehicle information, or on the basis of the vehicle information and the environment information.

The vehicle control information may have any content as long as it relates to control of the patrol car 101. For example, the vehicle control information may include control information for performing control related to movement of the patrol car 101 (for example, control of starting/stopping of the engine, control of operation units of an accelerator, a brake, a steering wheel, a shift lever, and the like, control of a location, an orientation, a speed, and the like of the patrol car 101, and the like). Furthermore, for example, the vehicle control information may include control information for performing control (such as, for example, control of a rotating light, a siren, a loudspeaker, a radio, and the like) regarding the attached equipment of the patrol car 101.

Of course, the base station 102 can supply any information other than the vehicle control information, to the patrol car 101.

<Terminal Control Information>

Furthermore, although not illustrated, the base station 102 may supply terminal control information for controlling the terminal device 104, to the terminal device 104. In this case, the base station 102 generates this terminal control information on the basis of the vehicle information, or on the basis of the vehicle information and the environment information. The terminal device 104 drives the terminal device 104 on the basis of this terminal control information. That is, the base station 102 may control the terminal device 104 on the basis of the vehicle information, or on the basis of the vehicle information and the environment information.

The terminal control information may have any content as long as it relates to control of the terminal device 104. For example, the terminal control information may include control information for performing control related to imaging of a subject by the terminal device 104 (for example, control of a start and an end of imaging, resolution, an aperture, sensitivity, a depth of field, an angle of view (zoom, pan, tilt), an orientation, image processing (such as white balance adjustment and filter processing), or the like).

Of course, the base station 102 can supply any information other than the terminal control information to the terminal device 104.

<Live Streaming>

Furthermore, as shown in FIG. 2, the base station 102 may perform streaming distribution (live streaming) of a captured image generated in the flying body 103 (camera 112), to another apparatus such as the central control server 105. For example, under a specific situation such as when the police officer 113 is in a dangerous situation, the base station 102 may perform streaming distribution of a captured image generated by the flying body 103 (camera 112). Then, an operator who operates the central control server 105 and manages (monitors) a behavior or the like of the police officer 113 may give an instruction to the police officer 113 or the like on the basis of the captured image in the streaming distribution. Doing in such a way allows the operator to more easily grasp the situation of the police officer 113 on the basis of the captured image in the streaming distribution. Therefore, this operator can more appropriately instruct (support) the police officer 113 and the like under more various situations.

Of course, the base station 102 can supply any information other than the streaming data to the central control server 105.

<Patrol Car>

Figure 3:
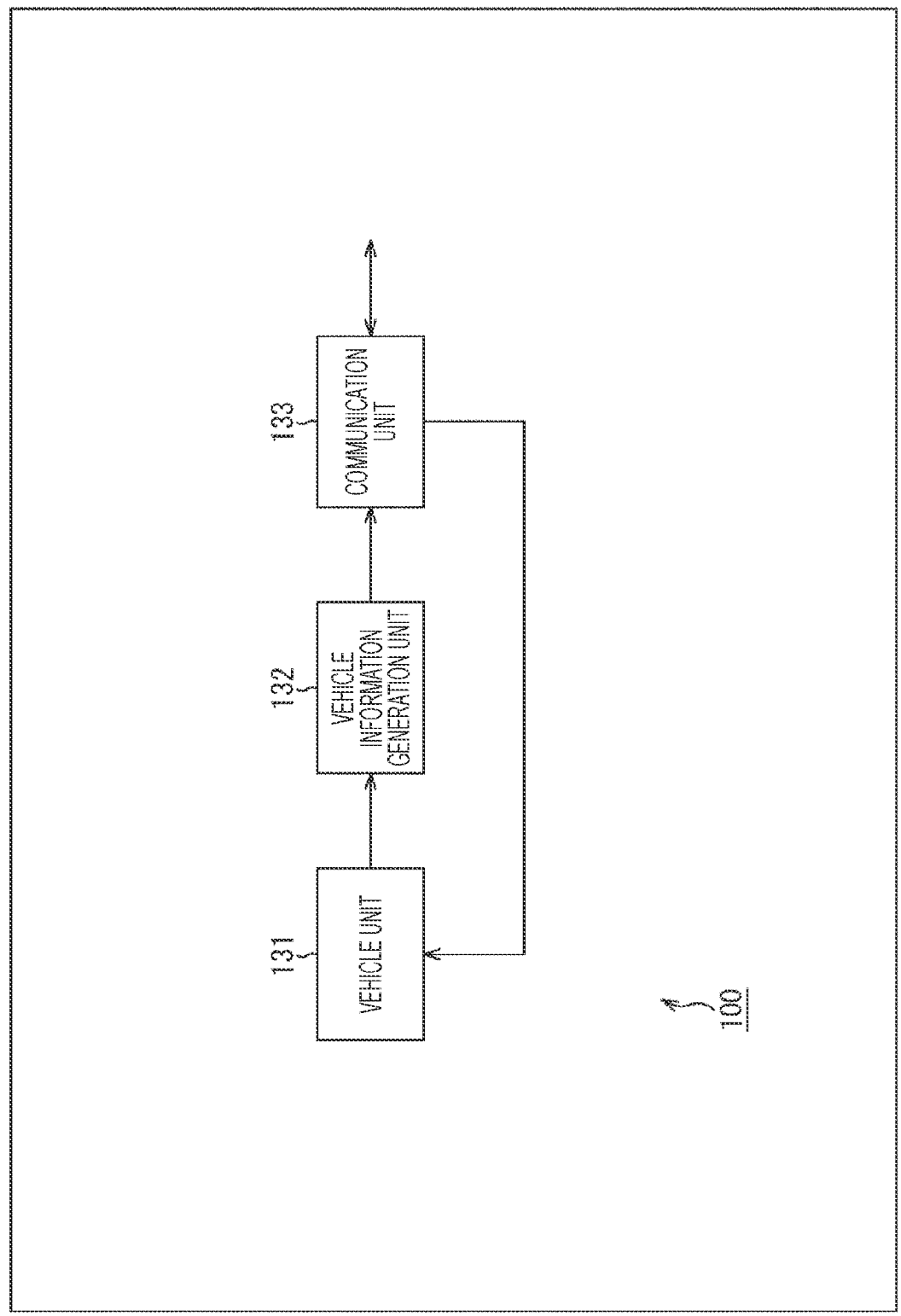
FIG. 3 is a block diagram showing a main configuration example of a patrol car.

Next, a configuration of each device will be described. FIG. 3 is a block diagram showing an example of a main configuration of the patrol car 101, which is one aspect of an information processing apparatus (vehicle) to which the present technology is applied. As shown in FIG. 3, the patrol car 101 includes a vehicle unit 131, a vehicle information generation unit 132, and a communication unit 133.

The vehicle unit 131 has, of the patrol car 101, a configuration as a vehicle, a configuration as attached equipment of the vehicle, a configuration for acquiring information to be included in the vehicle information from these configurations, and the like. The configuration as the vehicle includes any configuration as the vehicle, for example, an engine, a transmission, a tire, an accelerator, a brake system, a steering wheel, a seat, a light, a vehicle body, and the like. The configuration as the attached equipment of the vehicle includes any configuration as the attached equipment of the vehicle, such as: any equipment provided in the patrol car 101, such as, for example, a rotating light, a siren, a loudspeaker, a wireless communication device, and a car navigation system; and equipment attachable to and detachable from the patrol car 101 such as a weapon (a gun, a baton, or the like) and a tool (a flashlight, a sign, or the like). The configuration for acquiring information to be included in the vehicle information from these configurations includes, for example, a sensor or the like that acquires vehicle location and position information, vehicle speed information, vehicle operation information, vehicle attached equipment information, or the like.

The vehicle unit 131 supplies information acquired by the configuration (the configuration for acquiring information to be included in the vehicle information) (for example, the vehicle location and position information, the vehicle speed information, the vehicle operation information, the vehicle attached equipment information, or the like) to the vehicle information generation unit 132. Furthermore, the vehicle unit 131 can also be driven on the basis of vehicle control information supplied from the communication unit 133.

The vehicle information generation unit 132 acquires the information supplied from the vehicle unit 131, and generates vehicle information including the information. The vehicle information generation unit 132 supplies the generated vehicle information, to the communication unit 133.

The communication unit 133 has a communication interface, and communicates with other devices via the communication interface. Any scheme (standard) may be adopted for this communication, and wireless communication, wired communication, or both may be adopted. For example, the communication unit 133 communicates with the base station 102, and transmits the vehicle information supplied from the vehicle information generation unit 132, to the base station 102. Furthermore, the communication unit 133 can also communicate with the base station 102, receive vehicle control information transmitted from the base station 102, and supply the vehicle control information to the vehicle unit 131.

Note that the vehicle information generation unit 132 can have any configuration. For example, the vehicle information generation unit 132 may be configured by a logic circuit that realizes the above-described processing. Furthermore, the vehicle information generation unit 132 may have, for example, a central processing unit (CPU), a read only memory (ROM), a random access memory (RAM), and the like, and execute a program by using them to realize the above-described processing. Of course, the vehicle information generation unit 132 may have both configurations, realize a part of the above-described processing by the logic circuit, and realize other by executing the program.

Furthermore, the vehicle unit 131 and the communication unit 133 can have any configuration in addition to the above-described configuration. For example, the vehicle unit 131 and the communication unit 133 may include a logic circuit that realizes a control process for controlling the above-described configuration. Furthermore, the vehicle unit 131 and the communication unit 133 may have, for example, a CPU, a ROM, a RAM, and the like, and execute a program by using them to realize the control process. Of course, the vehicle unit 131 and the communication unit 133 may have both configurations, realize a part of the control process by the logic circuit, and realize other by executing the program.

Note that the configurations of the individual processing units may be independent from each other, and for example, a part of processing units may realize processing by a logic circuit, another part of the processing units may realize processing by executing a program, and other processing units may realize processing by both the logic circuit and the execution of the program.

<Base Station>

Figure 4:
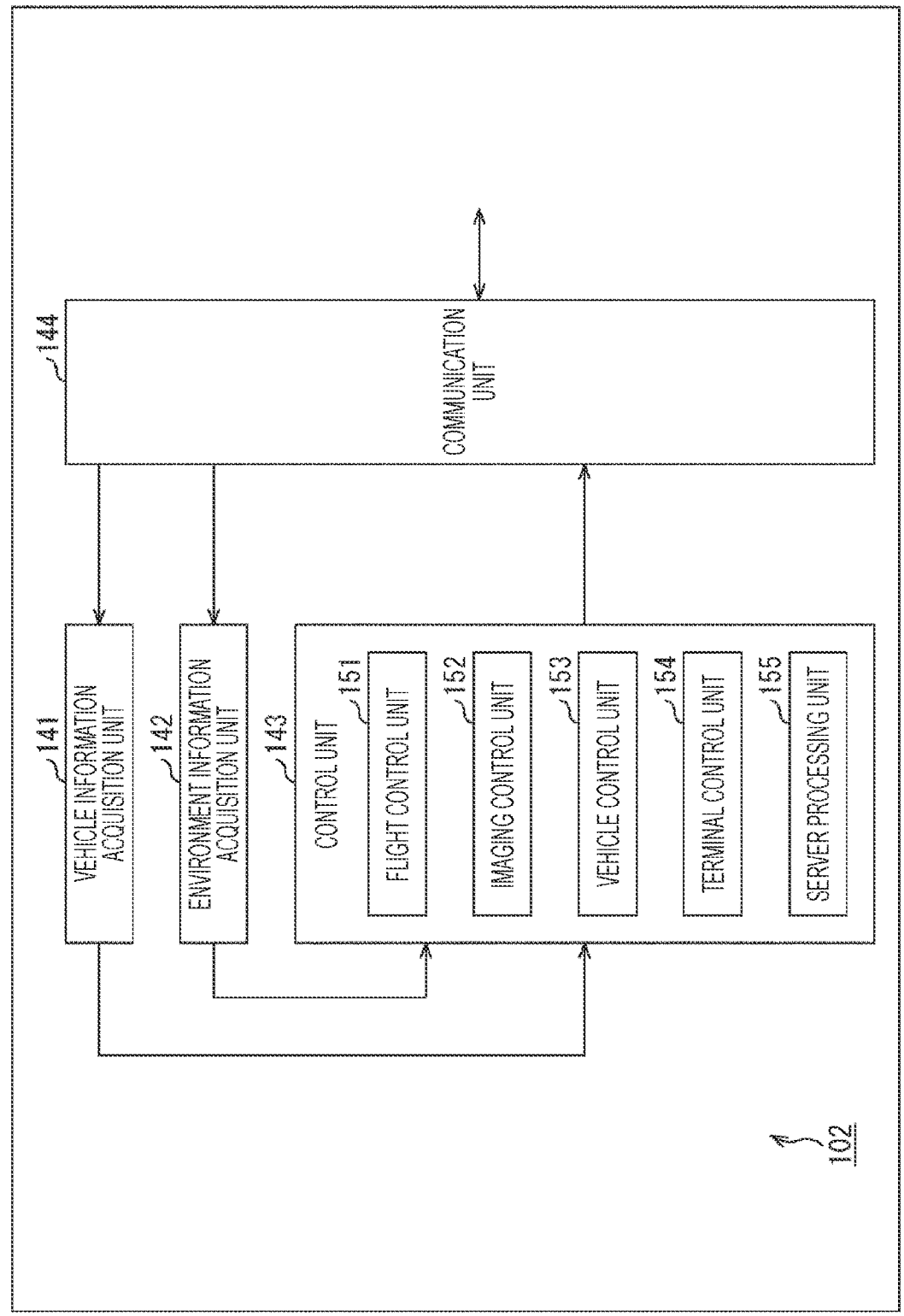
FIG. 4 is a block diagram showing a main configuration example of a base station.

FIG. 4 is a block diagram showing an example of a main configuration of the base station 102, which is one aspect of an information processing apparatus to which the present technology is applied. As shown in FIG. 4, the base station 102 includes a vehicle information acquisition unit 141, an environment information acquisition unit 142, a control unit 143, and a communication unit 144.

The vehicle information acquisition unit 141 performs processing related to acquisition of vehicle information. For example, the vehicle information acquisition unit 141 acquires vehicle information of the patrol car 101 supplied from the communication unit 144. The vehicle information acquisition unit 141 supplies the acquired vehicle information to the control unit 143.

The environment information acquisition unit 142 performs processing related to acquisition of environment information. For example, the environment information acquisition unit 142 acquires environment information (for example, a captured image, an analysis result of the captured image, an instruction command, and the like transmitted from another device) supplied from the communication unit 144. The environment information acquisition unit 142 supplies the acquired environment information to the control unit 143.

The control unit 143 performs processing related to control of the imaging device (the flying body 103 including the camera 112). For example, the control unit 143 acquires vehicle information supplied from the vehicle information acquisition unit 141. Furthermore, the control unit 143 acquires the environment information supplied from the environment information acquisition unit 142. Moreover, the control unit 143 controls the imaging device (the flying body 103 including the camera 112) on the basis of the acquired vehicle information or on the basis of the acquired vehicle information and environment information.

For example, the control unit 143 includes an imaging control unit 152. The imaging control unit 152 performs processing related to control of imaging of a subject by the camera 112. For example, the imaging control unit 152 generates imaging control information on the basis of the vehicle information or on the basis of the vehicle information and the environment information. Furthermore, the imaging control unit 152 supplies the generated imaging control information to the communication unit 144, and causes the communication unit 144 to transmit to the flying body 103 (camera 112). In accordance with this imaging control information, the flying body 103 (camera 112) is driven. That is, the imaging control unit 152 controls imaging of a subject by the camera 112, on the basis of the vehicle information or on the basis of the vehicle information and the environment information.

Furthermore, the control unit 143 may include a flight control unit 151. The flight control unit 151 performs processing related to control of flight by the flying body 103. For example, the flight control unit 151 generates flight control information on the basis of the vehicle information or on the basis of the vehicle information and the environment information. Furthermore, the flight control unit 151 supplies the generated flight control information to the communication unit 144, and causes the communication unit 144 to transmit to the flying body 103. In accordance with this flight control information, the flying body 103 is driven. That is, the flight control unit 151 controls flight of the flying body 103 on the basis of the vehicle information or on the basis of the vehicle information and the environment information.

Furthermore, the control unit 143 may include a vehicle control unit 153. The vehicle control unit 153 performs processing related to control of the patrol car 101, which is a vehicle. For example, the vehicle control unit 153 generates vehicle control information on the basis of the vehicle information or on the basis of the vehicle information and the environment information. Furthermore, the vehicle control unit 153 supplies the generated vehicle control information to the communication unit 144, and causes the communication unit 144 to transmit to the patrol car 101. In accordance with this vehicle control information, the patrol car 101 is driven. That is, the vehicle control unit 153 controls the patrol car 101, which is a vehicle, on the basis of the vehicle information or on the basis of the vehicle information and the environment information.

Furthermore, the control unit 143 may include a terminal control unit 154. The terminal control unit 154 performs processing related to control of the terminal device 104. For example, the terminal control unit 154 generates terminal control information on the basis of the vehicle information or on the basis of the vehicle information and the environment information. Furthermore, the terminal control unit 154 supplies the generated terminal control information to the communication unit 144, and causes the communication unit 144 to transmit to the terminal device 104. The terminal device 104 is driven in accordance with this the terminal control information, and performs imaging or detects predetermined information by using a sensor, for example. That is, the terminal control unit 154 controls the terminal device 104 on the basis of the vehicle information or on the basis of the vehicle information and the environment information.

Furthermore, the control unit 143 may include a server processing unit 155. The server processing unit 155 performs processing on the central control server 105. For example, the server processing unit 155 exchanges information with the central control server 105, via the communication unit 144. For example, the server processing unit 155 acquires, from the communication unit 144, environment information (an instruction command) transmitted from the central control server 105 and received by the communication unit 144. The server processing unit 155 supplies the acquired environment information (instruction command) to a processing unit corresponding to the instruction command, among the flight control unit 151 to the terminal control unit 154. Furthermore, for example, the server processing unit 155 acquires, from the communication unit 144, streaming data of a captured image transmitted from the flying body 103 (camera 112) and received by the communication unit 144. The server processing unit 155 supplies the acquired streaming data to the communication unit 144, and causes the communication unit 144 to transmit to the central control server 105 (preforms streaming distribution of the captured image to the central control server 105).

The communication unit 144 has a communication interface, and communicates with other devices via the communication interface. Any scheme (standard) may be adopted for this communication, and wireless communication, wired communication, or both may be adopted.

For example, the communication unit 144 communicates with the patrol car 101 (communication unit 133), and receives vehicle information transmitted from the patrol car 101. The communication unit 144 supplies the vehicle information to the vehicle information acquisition unit 141. Furthermore, the communication unit 144 may communicate with the flying body 103 (a communication unit 165 to be described later), to receive environment information (such as a captured image) transmitted from the flying body 103. Moreover, the communication unit 144 may communicate with the terminal device 104 (a communication unit 175 to be described later), to receive environment information (a captured image or the like) transmitted from the terminal device 104. Furthermore, the communication unit 144 may communicate with the central control server 105 (a communication unit 183 to be described later), to receive environment information (an instruction command or the like) transmitted from the central control server 105. The communication unit 144 supplies the received environment information to the environment information acquisition unit 142.

Furthermore, for example, the communication unit 144 communicates with the flying body 103 (communication unit 165), and transmits imaging control information supplied from the control unit 143 (imaging control unit 152), to the flying body 103 (communication unit 165). Furthermore, the communication unit 144 may communicate with the flying body 103 to transmit the flight control information supplied from the control unit 143 (flight control unit 151), to the flying body 103.

Furthermore, the communication unit 144 may communicate with the patrol car 101 (communication unit 133) to transmit the vehicle control information supplied from the control unit 143 (vehicle control unit 153), to the patrol car 101. Moreover, the communication unit 144 may communicate with the terminal device 104 to transmit the terminal control information supplied from the control unit 143 (terminal control unit 154), to the terminal device 104 (communication unit 175). Furthermore, the communication unit 144 may communicate with the central control server 105 (communication unit 183) to transmit streaming data supplied from the control unit 143 (server processing unit 155), to the central control server 105.

Note that each processing unit of the vehicle information acquisition unit 141 to the control unit 143 can have any configuration. For example, each processing unit may be configured by a logic circuit that realizes the above-described processing. Furthermore, each of the processing units may include, for example, a CPU, a ROM, a RAM, and the like, and execute a program by using them to realize the above-described processing. Of course, each processing unit may have both configurations, realize a part of the above-described processing by the logic circuit, and realize other by executing the program.

Furthermore, the communication unit 144 can have any configuration in addition to the above-described communication interface. For example, the communication unit 144 may include a logic circuit that realizes the control process for controlling the above-described communication interface. Furthermore, the communication unit 144 may have, for example, a CPU, a ROM, a RAM, and the like, and execute a program by using them to realize the control process. Of course, the communication unit 144 may have both configurations, realize a part of the control process by the logic circuit, and realize other by executing the program.

Note that the configurations of the individual processing units (the vehicle information acquisition unit 141 to the communication unit 144) may be independent from each other, for example, a part of processing units may realize processing by a logic circuit, another part of the processing units may realize processing by executing a program, and other processing units may realize processing by both the logic circuit and the execution of the program.

Note that, in a case where the environment information is not used, the environment information acquisition unit 142 can be omitted. Furthermore, in a case where the control unit 143 does not control flight of the flying body 103, the flight control unit 151 can be omitted. Moreover, in a case where the control unit 143 does not control the patrol car 101, the vehicle control unit 153 can be omitted. Furthermore, in a case where the control unit 143 does not control the terminal device 104, the terminal control unit 154 can be omitted. Moreover, in a case where the control unit 143 does not exchange information with the central control server 105, the server processing unit 155 can be omitted.

<Flying Body>

Figure 5:
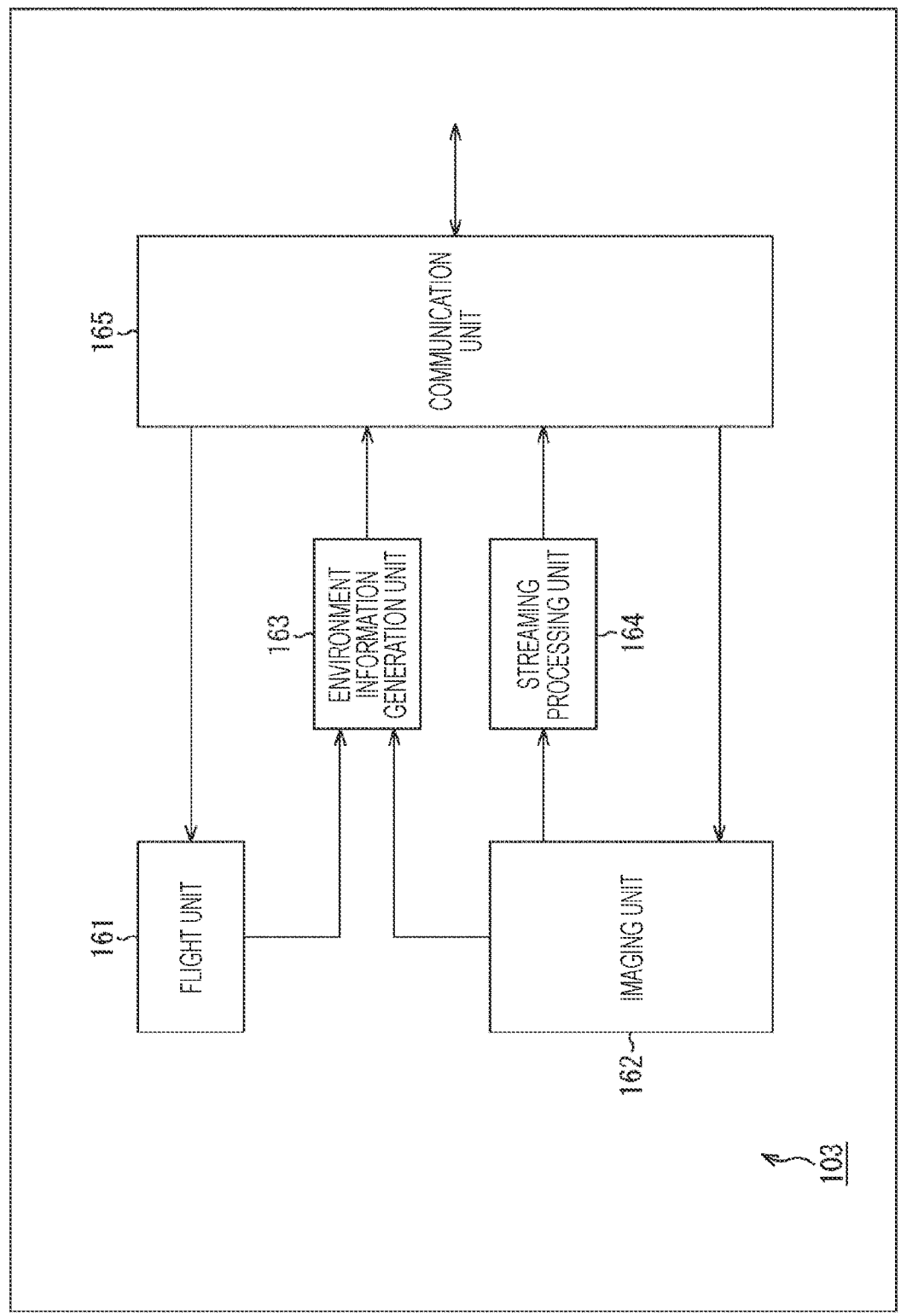
FIG. 5 is a block diagram showing a main configuration example of a flying body.

FIG. 5 is a block diagram showing an example of a main configuration of the flying body 103, which is one aspect of an imaging device (or a mobile body), to which the present technology is applied. As shown in FIG. 5, the flying body 103 has a flight unit 161, an imaging unit 162, an environment information generation unit 163, a streaming processing unit 164, and the communication unit 165.

The flight unit 161 has a configuration related to flight of the flying body 103, and performs processing related to flight of the flying body 103. The configuration related to the flight includes, for example, a propeller, a motor, a control unit configured to control these, and the like. For example, the flight unit 161 drives these configurations to cause the flying body 103 to fly. Furthermore, the flight unit 161 has a configuration for acquiring information to be included in the environment information, from the configuration related to flight. The information to be included in the environment information includes, for example, information regarding flight such as a location, a position (an orientation, an inclination, and the like), a speed, and a rotation speed of the propeller of the flying body 103. Furthermore, information regarding surroundings of the flying body 103 such as a temperature and a wind speed may be included.

Furthermore, such a configuration for acquiring information to be included in the environment information may include a configuration for acquiring information regarding flight, such as, for example, a positioning unit configured to measure a location of the flying body 103 by using a GPS signal or the like, a gyro sensor configured to detect a position and a speed, and a sensor configured to detect a rotation speed of a propeller. Furthermore, a configuration for acquiring information regarding surroundings of the flying body 103, such as a temperature sensor and a wind speed sensor, may be included. Moreover, a control unit configured to control these sensors and the like may be included.

The flight unit 161 acquires flight control information (flight control information transmitted from the base station 102) supplied from the communication unit 165. The flight unit 161 causes the flying body 103 to fly in accordance with the acquired flight control information. Furthermore, the flight unit 161 acquires information to be included in the environment information, and supplies the information to the environment information generation unit 163.

The imaging unit 162 includes, for example, the camera 112, and a control unit configured to control driving and a position (an orientation, an inclination, and the like) of the camera 112, and performs processing related to imaging of a subject. For example, the imaging unit 162 acquires imaging control information (imaging control information transmitted from the base station 102) supplied from the communication unit 165. The imaging unit 162 captures an image of a subject by using the camera 112 in accordance with the acquired imaging control information.

For example, the imaging unit 162 sets parameters related to imaging (exposure, a timing, a shutter speed, an imaging location, an imaging direction, an angle of view, image processing, and the like) in accordance with the imaging control information, and performs imaging to generate a captured image. The imaging unit 162 supplies the generated captured image to the environment information generation unit 163, as information to be included in the environment information. Furthermore, the imaging unit 162 may analyze the generated captured image for predetermined information, and supply an analysis result to the environment information generation unit 163 as information to be included in the environment information. Moreover, the imaging unit 162 may supply the generated captured image to the streaming processing unit 164.

The environment information generation unit 163 performs processing related to generation of environment information. For example, the environment information generation unit 163 acquires a captured image (or an analysis result thereof) supplied from the imaging unit 162. The environment information generation unit 163 generates environment information including the captured image (or the analysis result thereof), and supplies the generated environment information to the communication unit 165. Furthermore, for example, the environment information generation unit 163 acquires information regarding flight supplied from the flight unit 161, as information to be included in the environment information. Furthermore, the environment information generation unit 163 acquires information regarding surroundings of the flying body 103 supplied from the flight unit 161, as information to be included in the environment information. The environment information generation unit 163 generates environment information including these pieces of information, and supplies the generated environment information to the communication unit 165.

The streaming processing unit 164 performs processing related to streaming distribution of a captured image. For example, the streaming processing unit 164 acquires a captured image (flying body captured image) supplied from the imaging unit 162. The streaming processing unit 164 supplies the flying body captured image to the communication unit 165 as streaming data.

The communication unit 165 has a communication interface, and communicates with other devices via the communication interface. Any scheme (standard) may be adopted for this communication, and wireless communication, wired communication, or both may be adopted.

For example, the communication unit 165 communicates with the base station 102 (communication unit 144), to receive imaging control information transmitted from the base station 102. The communication unit 165 supplies the received imaging control information to the imaging unit 162. As a result, the imaging unit 162 can perform imaging on the basis of the imaging control information.

Furthermore, the communication unit 165 may communicate with the base station 102 (communication unit 144), to receive flight control information transmitted from the base station 102. In this case, the communication unit 165 supplies the received flight control information to the flight unit 161. As a result, the flight unit 161 can fly on the basis of the flight control information.

Furthermore, the communication unit 165 may acquire environment information supplied from the environment information generation unit 163, communicate with the base station 102 (the communication unit 144), and transmit the environment information to the base station 102. Moreover, the communication unit 165 may acquire streaming data (a flying body captured image) supplied from the streaming processing unit 164, communicate with the base station 102 (the communication unit 144), and transmit the streaming data to the base station 102.

Note that, each processing unit of the environment information generation unit 163 and the streaming processing unit 164 can have any configuration. For example, each processing unit may be configured by a logic circuit that realizes the above-described processing. Furthermore, each of the processing units may include, for example, a CPU, a ROM, a RAM, and the like, and execute a program by using them to realize the above-described processing. Of course, each processing unit may have both configurations, realize a part of the above-described processing by the logic circuit, and realize other by executing the program.

Furthermore, each of the processing units of the flight unit 161, the imaging unit 162, and the communication unit 165 can have any configuration in addition to the above-described configuration. For example, each processing unit may include a logic circuit that realizes a control process for controlling the above-described configuration. Furthermore, each processing unit may have, for example, a CPU, a ROM, a RAM, and the like, and execute a program by using them to realize the control process. Of course, each processing unit may have both configurations, realize a part of the control process by the logic circuit, and realize other by executing the program.

Note that the configurations of the individual processing units may be independent from each other, and for example, a part of processing units may realize processing by a logic circuit, another part of the processing units may realize processing by executing a program, and other processing units may realize processing by both the logic circuit and the execution of the program.

Note that, in a case where the flying body 103 does not output the environment information, the environment information generation unit 163 can be omitted. Furthermore, in a case where streaming distribution of a captured image is not performed, the streaming processing unit 164 can be omitted.

<Terminal Device>

Figure 6:
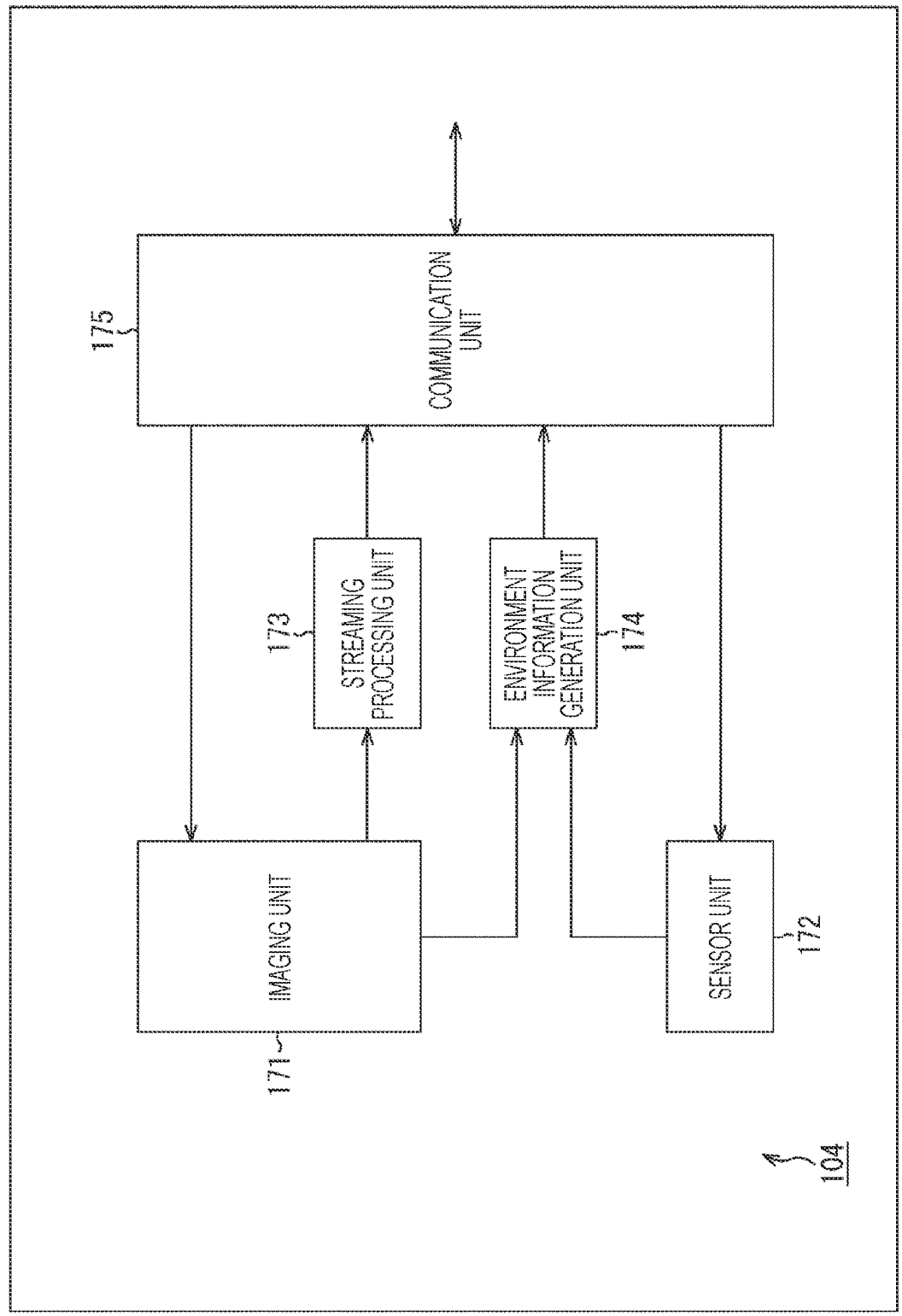
FIG. 6 is a block diagram showing a main configuration example of a terminal device.

FIG. 6 is a block diagram showing an example of a main configuration of the terminal device 104, which is one aspect of an information processing apparatus to which the present technology is applied. As shown in FIG. 6, the terminal device 104 includes an imaging unit 171, a sensor unit 172, a streaming processing unit 173, an environment information generation unit 174, and the communication unit 175.

The imaging unit 171 performs processing related to imaging of a subject. For example, the imaging unit 171 sets parameters related to imaging (exposure, a timing, a shutter speed, an imaging location, an imaging direction, an angle of view, image processing, and the like), and captures an image of a subject to generate a captured image. Furthermore, the imaging unit 171 supplies the captured image to the environment information generation unit 174, as information to be included in the environment information. Note that, the imaging unit 171 may analyze the generated captured image for predetermined information, and supply an analysis result to the environment information generation unit 174 as information to be included in the environment information. Moreover, the imaging unit 171 may supply the generated captured image to the streaming processing unit 173.

Furthermore, for example, the imaging unit 171 may acquire terminal control information (terminal control information transmitted from the base station 102) supplied from the communication unit 175. Then, the imaging unit 171 may perform the above-described processing (imaging or the like) on the basis of the terminal control information.

The sensor unit 172 includes a sensor, a control unit configured to control the sensor, and the like, and performs processing related to information detection. This sensor may detect any information. For example, this sensor may be a sensor configured to detect a state around the police officer 113, such as a microphone, a temperature sensor, a humidity sensor, a brightness sensor, or an invisible light sensor of infrared rays and the like, may be a sensor configured to detect a position and a motion of the terminal device 104, such as a gyro sensor, or may be a sensor configured to detect biological information of the police officer 113, such as a heart rate, a pulse, and a line-of-sight direction. Furthermore, any number of sensors may be included in the sensor unit 172. The number may be singular or plural. Furthermore, the sensor unit 172 may include a plurality of sensors that detects different types of information. Of course, one sensor may be able to detect a plurality of types of information.

The sensor unit 172 supplies information (sensor information) detected using such a sensor to the environment information generation unit 174, as information to be included in the environment information. Note that, for example, the sensor unit 172 may acquire terminal control information (terminal control information transmitted from the base station 102) supplied from the communication unit 175. Then, the sensor unit 172 may perform the above-described processing (information detection or the like) on the basis of the terminal control information.

The streaming processing unit 173 performs processing related to streaming distribution of a captured image (terminal captured image) generated by the imaging unit 171. For example, the streaming processing unit 173 acquires a captured image supplied from the imaging unit 171. The streaming processing unit 173 supplies the captured image to the communication unit 175 as streaming data.

The environment information generation unit 174 performs processing related to generation of environment information. For example, the environment information generation unit 174 acquires a terminal captured image (or an analysis result thereof) supplied from the imaging unit 171. The environment information generation unit 174 generates environment information including the terminal captured image (or the analysis result thereof), and supplies the generated environment information to the communication unit 175. Furthermore, for example, the environment information generation unit 174 acquires sensor information supplied from the sensor unit 172, as information to be included in the environment information. The environment information generation unit 174 generates environment information including the sensor information, and supplies the generated environment information to the communication unit 175.

The communication unit 175 has a communication interface, and communicates with other devices via the communication interface. Any scheme (standard) may be adopted for this communication, and wireless communication, wired communication, or both may be adopted.

For example, the communication unit 175 acquires the environment information supplied from the environment information generation unit 174, communicates with the base station 102 (the communication unit 144), and transmits the environment information to the base station 102. Furthermore, the communication unit 175 acquires streaming data supplied from the streaming processing unit 173, communicates with the base station 102 (the communication unit 144), and transmits the streaming data to the base station 102.

Moreover, the communication unit 175 communicates with the base station 102 (communication unit 144), to receive terminal control information transmitted from the base station 102. The communication unit 175 supplies the received terminal control information to the imaging unit 171 and the sensor unit 172. As a result, the imaging unit 171 and the sensor unit 172 can perform imaging on the basis of the terminal control information.

Note that each processing unit of the streaming processing unit 173 and the environment information generation unit 174 can have any configuration. For example, each processing unit may be configured by a logic circuit that realizes the above-described processing. Furthermore, each of the processing units may include, for example, a CPU, a ROM, a RAM, and the like, and execute a program by using them to realize the above-described processing. Of course, each processing unit may have both configurations, realize a part of the above-described processing by the logic circuit, and realize other by executing the program.

Furthermore, each processing unit of the imaging unit 171, the sensor unit 172, and the communication unit 175 can have any configuration in addition to the above-described configuration. For example, each processing unit may include a logic circuit that realizes a control process for controlling the above-described configuration. Furthermore, each processing unit may have, for example, a CPU, a ROM, a RAM, and the like, and execute a program by using them to realize the control process. Of course, each processing unit may have both configurations, realize a part of the control process by the logic circuit, and realize other by executing the program.

Note that the configurations of the individual processing units may be independent from each other, and for example, a part of processing units may realize processing by a logic circuit, another part of the processing units may realize processing by executing a program, and other processing units may realize processing by both the logic circuit and the execution of the program.

Note that, in a case where the terminal device 104 does not output the environment information, the environment information generation unit 174 can be omitted. Furthermore, in a case where streaming distribution of a captured image is not performed, the streaming processing unit 173 can be omitted.

<Central Control Server>

Figure 7:
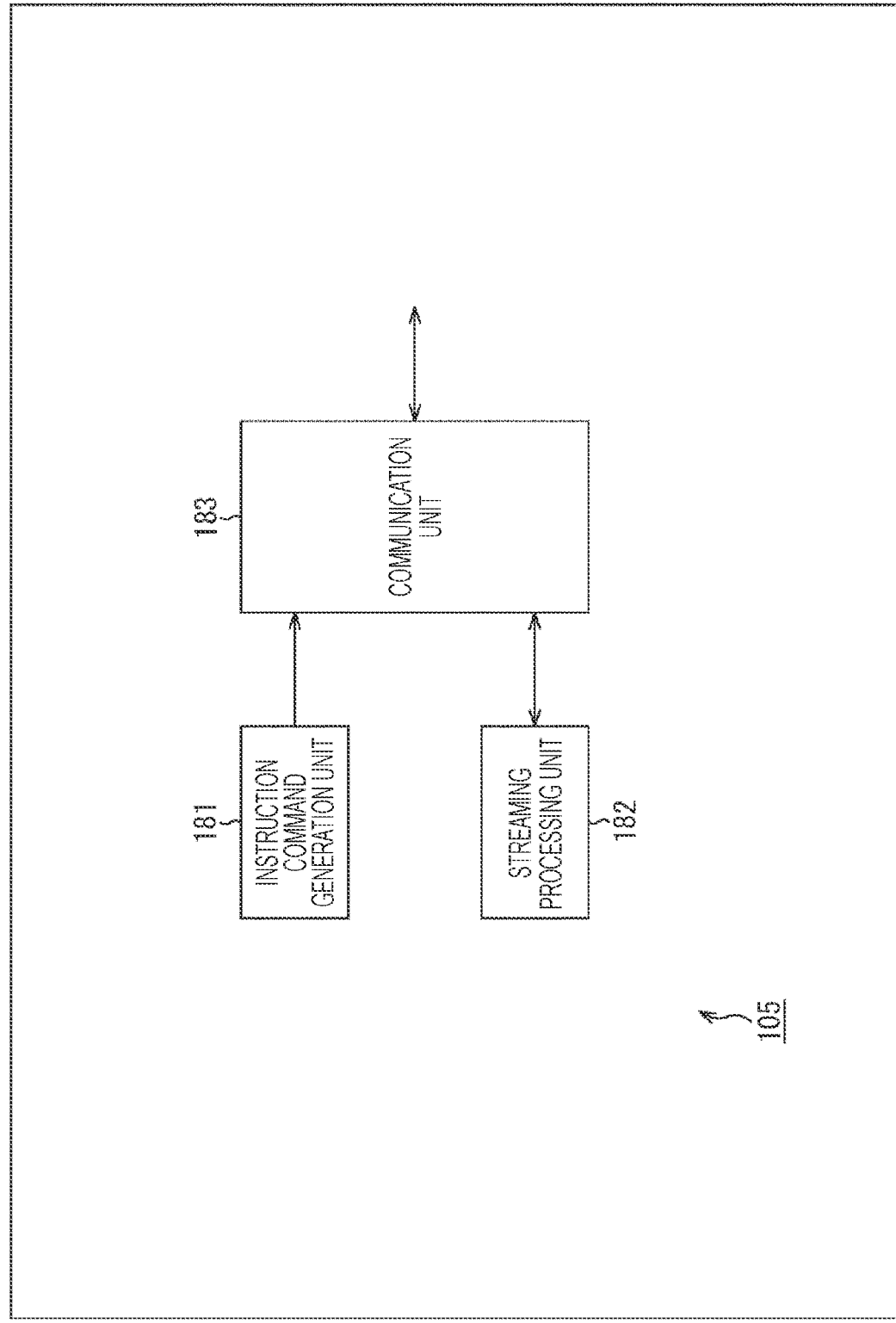
FIG. 7 is a block diagram showing a main configuration example of a central control server.

FIG. 7 is a block diagram showing an example of a main configuration of the central control server 105, which is one aspect of an information processing apparatus to which the present technology is applied. As shown in FIG. 7, the central control server 105 includes an instruction command generation unit 181, a streaming processing unit 182, and the communication unit 183.

The instruction command generation unit 181 performs processing related to generation of an instruction command for another device of the patrol support system 100. The instruction command generation unit 181 receives, for example, a user (operator) operation on a user interface (not illustrated), and generates an instruction command on the basis of the user operation or the like. The instruction command generation unit 181 supplies the generated instruction command to the communication unit 183, as environment information.

The communication unit 183 has a communication interface, and communicates with other devices via the communication interface. Any scheme (standard) may be adopted for this communication, and wireless communication, wired communication, or both may be adopted.

For example, the communication unit 183 acquires the environment information (including the instruction command) supplied from the instruction command generation unit 181, and communicates with the base station 102 (communication unit 144), and transmits the environment information (instruction command) to the base station 102.

Furthermore, the communication unit 183 receives streaming data transmitted from the base station 102, and supplies the streaming data to the streaming processing unit 182.

Moreover, the streaming processing unit 182 acquires the streaming data supplied from the communication unit 183, and reproduces and displays the streaming data. As a result, an operator can view a captured image in the streaming distribution. As a result, the operator can more easily grasp a situation around the patrol car 101 and the police officer 113. Therefore, a more appropriate instruction command can be performed in accordance with the situation.

Note that each processing unit of the instruction command generation unit 181 and the streaming processing unit 182 can have any configuration. For example, each processing unit may be configured by a logic circuit that realizes the above-described processing. Furthermore, each of the processing units may include, for example, a CPU, a ROM, a RAM, and the like, and execute a program by using them to realize the above-described processing. Of course, each processing unit may have both configurations, realize a part of the above-described processing by the logic circuit, and realize other by executing the program.

Furthermore, the communication unit 183 can individually have any configuration in addition to the above-described configuration. For example, the communication unit 183 may include a logic circuit that realizes a control process for controlling the above-described configuration. Furthermore, each processing unit may have, for example, a CPU, a ROM, a RAM, and the like, and execute a program by using them to realize the control process. Of course, each processing unit may have both configurations, realize a part of the control process by the logic circuit, and realize other by executing the program.

Note that the configurations of the individual processing units may be independent from each other, and for example, a part of processing units may realize processing by a logic circuit, another part of the processing units may realize processing by executing a program, and other processing units may realize processing by both the logic circuit and the execution of the program.

Note that, in a case where streaming distribution of the captured image is not performed, the streaming processing unit 182 can be omitted.

Each device has the above-described configuration and performs the above-described processing, which makes it possible to easily perform imaging according to more various situations.

<Flow of System Control Process>

Figure 8:
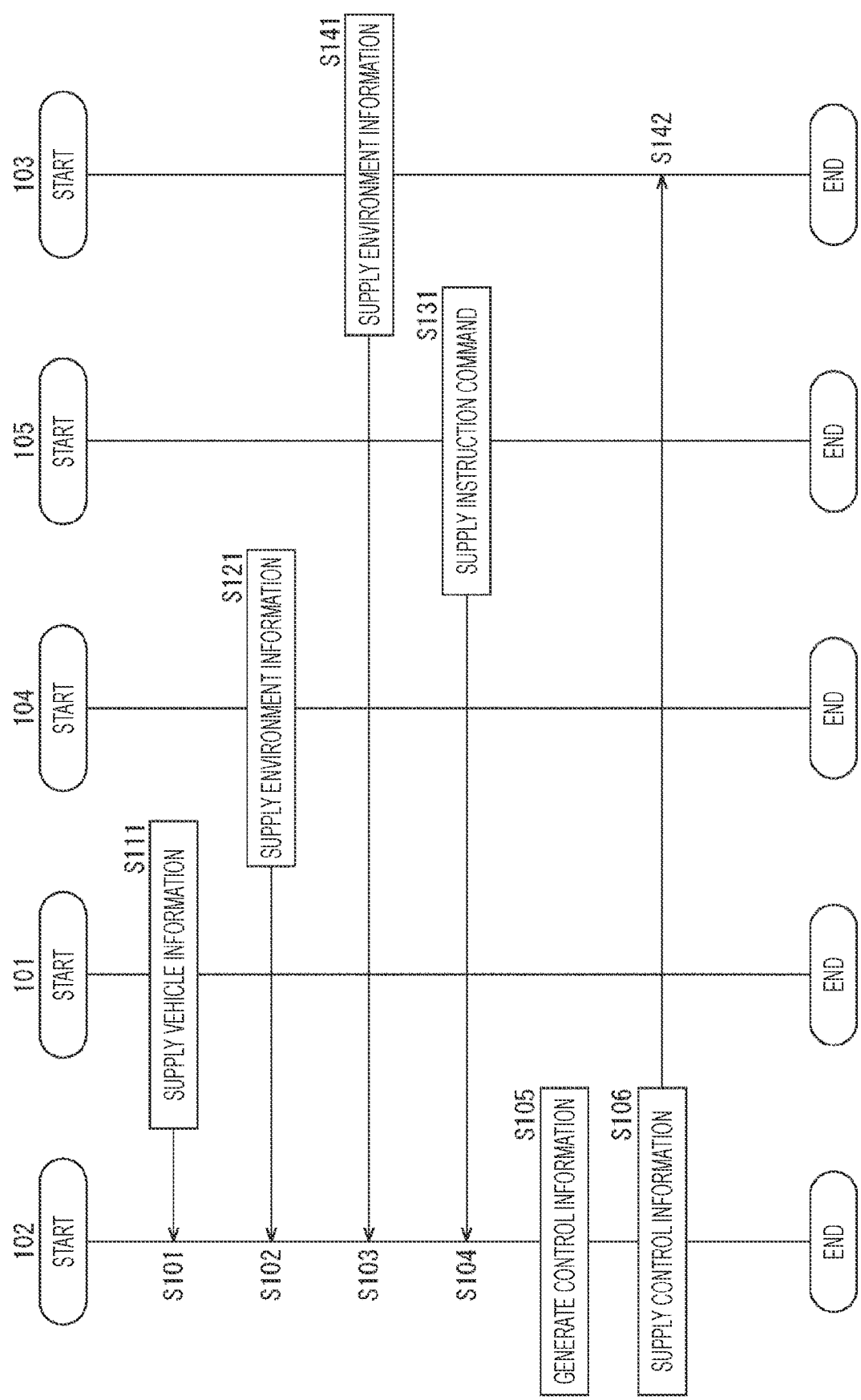
FIG. 8 is a flowchart for explaining an example of a flow of a control process of the entire system.

Next, an example of a flow of a control process executed by each device of the patrol support system 100 will be described with reference to a flowchart of FIG. 8.

When the control process is started, the vehicle information generation unit 132 of the patrol car 101 generates, in step S111, vehicle information including information supplied from the vehicle unit 131. Then, the communication unit 133 supplies the vehicle information to the base station 102. In step S101, the communication unit 144 of the base station 102 acquires the vehicle information.

Furthermore, in step S121, the environment information generation unit 174 of the terminal device 104 generates environment information including a terminal captured image. Then, the communication unit 175 supplies the environment information to the base station 102. In step S102, the communication unit 144 of the base station 102 acquires the environment information.

Furthermore, in step S141, the environment information generation unit 163 of the flying body 103 generates environment information including a flying body captured image. Then, the communication unit 165 supplies the environment information to the base station 102. In step S103, the communication unit 144 of the base station 102 acquires the environment information.

Furthermore, in step S131, the instruction command generation unit 181 of the central control server 105 generates (environment information including) an instruction command. Then, the communication unit 183 supplies the instruction command to the base station 102. In step S104, the communication unit 144 of the base station 102 acquires the environment information (instruction command).

In step S105, the control unit 143 of the base station 102 generates control information by appropriately using the information acquired in steps S101 to S104. For example, the imaging control unit 152 generates imaging control information by appropriately using the supplied vehicle information and environment information. Furthermore, for example, the flight control unit 151 generates flight control information by appropriately using the supplied vehicle information and environment information.

Note that, in step S105, the vehicle control unit 153 may generate vehicle control information by appropriately using the supplied vehicle information and environment information. Furthermore, the terminal control unit 154 may generate the terminal control information by appropriately using the supplied vehicle information and environment information.

In step S106, the communication unit 144 of the base station 102 transmits control information such as the imaging control information and the vehicle control information generated in step S105, to the flying body 103.

In step S142, the communication unit 165 of the flying body 103 acquires the control information (such as the imaging control information and the vehicle control information). The flight unit 161 of the flying body 103 performs flight in accordance with the flight control information. Furthermore, the imaging unit 162 of the flying body 103 captures an image of a subject in accordance with the imaging control information.

In this way, by controlling imaging and flight by the flying body 103 (camera 112) on the basis of the vehicle information, imaging according to more various situations can be more easily performed.

Note that, in a case where the vehicle control information is generated in step S105, the communication unit 144 may transmit the vehicle control information to the communication unit 133 of the patrol car 101 in step S106. In that case, the vehicle unit 131 is driven in accordance with the vehicle control information acquired by the communication unit 133.

Furthermore, in a case where the terminal control information is generated in step S105, the communication unit 144 may transmit the terminal control information to the communication unit 175 of the terminal device 104 in step S106. In that case, the imaging unit 171 and the sensor unit 172 perform processing in accordance with the terminal control information acquired by the communication unit 175.

<Flow of Flying Body Control Process>

Figure 9:
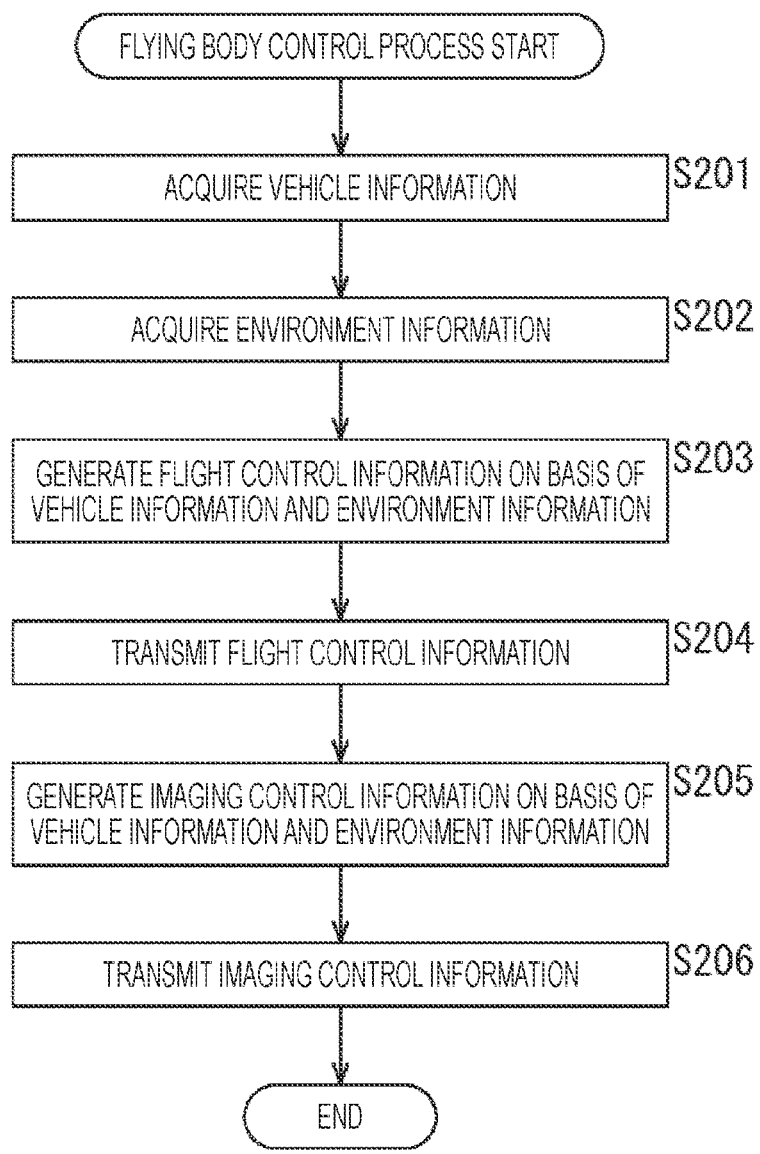
FIG. 9 is a flowchart for explaining an example of a flow of a flying body control process.

Next, for example, an example of a flow of a flying body control process executed by the base station 102 in step S105 and the like in FIG. 8 will be described with reference to the flowchart in FIG. 9.

When the flying body control process is started, in step S201, the vehicle information acquisition unit 141 acquires vehicle information transmitted from the patrol car 101, via the communication unit 144.

In step S202, the environment information acquisition unit 142 acquires environment information transmitted from the flying body 103 and the terminal device 104, via the communication unit 144.

In step S203, the flight control unit 151 generates flight control information on the basis of the vehicle information acquired in step S201, or on the basis of the vehicle information and the environment information acquired in step S202.

In step S204, the communication unit 144 transmits the flight control information generated in step S203 to the flying body 103. The flying body 103 flies in accordance with the flight control information. That is, the flight control unit 151 of the base station 102 controls flight of the flying body 103 on the basis of the vehicle information or on the basis of the vehicle information and the environment information.

Furthermore, in step S205, the imaging control unit 152 generates imaging control information on the basis of the vehicle information acquired in step S201 or on the basis of the vehicle information and the environment information acquired in step S202.

In step S206, the communication unit 144 transmits the imaging control information generated in step S205 to the flying body 103 (camera 112). The flying body 103 captures an image of a subject in accordance with the imaging control information. That is, the imaging control unit 152 of the base station 102 controls imaging of a subject by the camera 112, on the basis of the vehicle information or on the basis of the vehicle information and the environment information.

When the process of step S206 ends, the flying body control process ends. Executing each process in this way enables imaging according to more various situations to be more easily performed.

2. USE CASE 1-1 (LANDING CONTROL)

Figure 10:
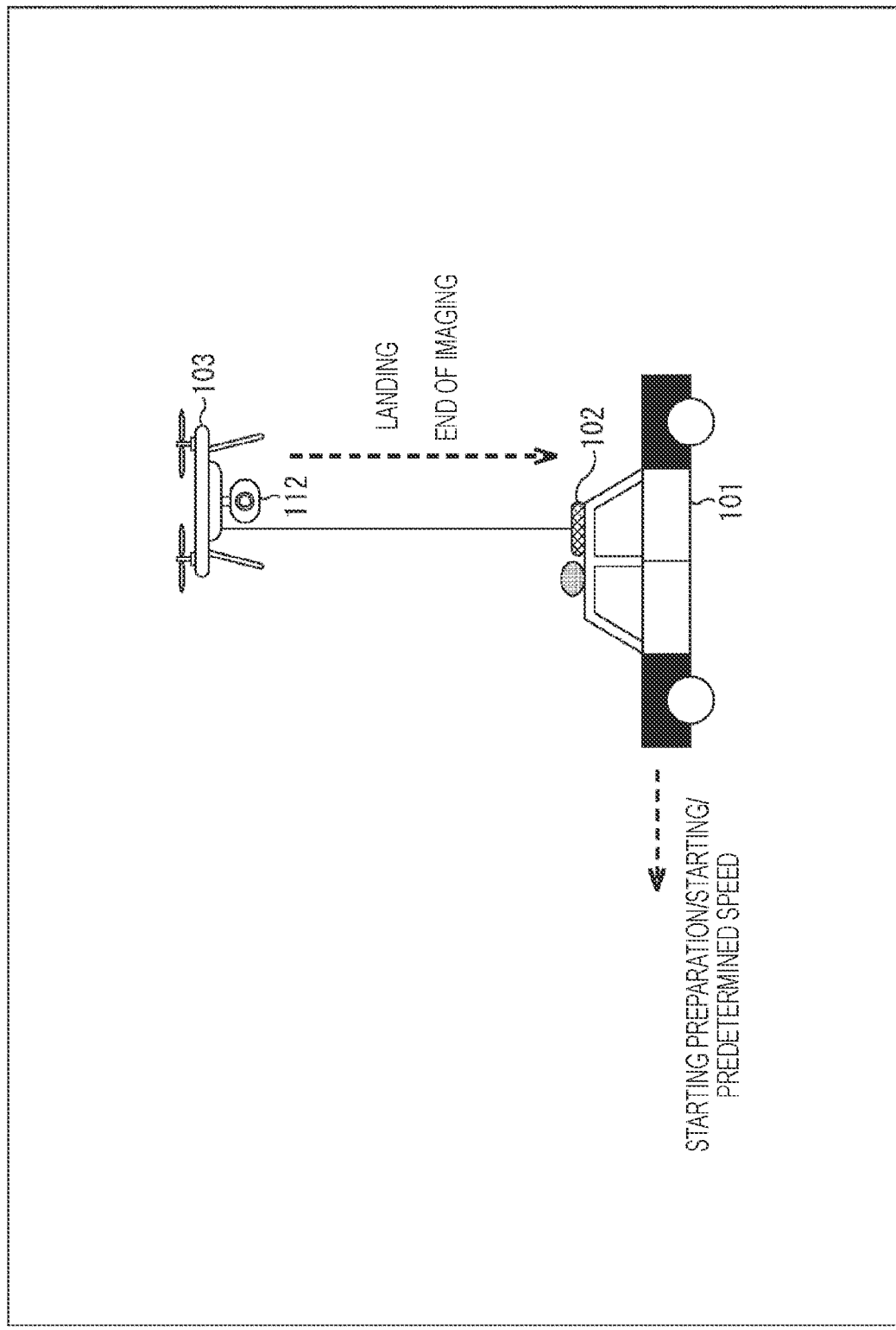
FIG. 10 is a view for explaining use case 1-1.

Next, a specific example of a method of controlling the flying body 103 and the camera 112 based on vehicle information or the like will be described. For example, as shown in FIG. 10, in an initial state, it is assumed that the patrol car 101 is stopped and the flying body 103 is flying in the sky. In such a state, on the basis of an action, a situation, and the like around starting of the patrol car 101, the base station 102 controls the flying body 103, to land on the base station 102.

In such landing control, the base station 102 may control the flying body 103 to land on the base station 102 when the patrol car 101 starts (accelerates from 0 km/h). In this case, when the base station 102 detects starting of the patrol car 101, for example, on the basis of vehicle speed information included in the vehicle information, the base station 102 generates flight control information for causing the flying body 103 to land on the base station 102 (a predetermined location), and transmits the flight control information to the flying body 103. In accordance with the flight control information, the flying body 103 lands on the base station 102.

Furthermore, the base station 102 may control the flying body 103 to land on the base station 102 when the started patrol car 101 accelerates to reach a predetermined speed (for example, 10 km/h or the like). In this case, when the base station 102 detects that the speed of the patrol car 101 has reached the predetermined speed, for example, on the basis of the vehicle speed information included in the vehicle information, the base station 102 generates flight control information for causing the flying body 103 to land on the base station 102 (a predetermined location), and transmits the flight control information to the flying body 103. In accordance with the flight control information, the flying body 103 lands on the base station 102.

Moreover, the base station 102 may control the flying body 103 to land on the base station 102, when a predetermined starting preparation action is performed (before starting) by the police officer 113 or the like in the patrol car 101. This starting preparation action may be any action. For example, the starting preparation operation may be opening and closing of a door (of a driver's seat) of the patrol car 101, wearing of a seat belt, gripping of a steering wheel, turning ON of an engine key, releasing of a brake pedal, a shift lever operation, parking brake release, turning on of a rotating light, or the like. Furthermore, the starting preparation action may be other actions. Furthermore, the starting preparation action may be a combination of a plurality of actions. For example, in a case where a steering wheel operation, release of a brake pedal, or the like is detected in a state where the door is closed, it may be determined as the starting preparation action.

In this case, when the base station 102 detects the starting preparation action, for example, on the basis of vehicle operation information, vehicle equipment information, or the like included in the vehicle information, the base station 102 generates flight control information for causing the flying body 103 to land on the base station 102 (a predetermined location), and transmits the flight control information to the flying body 103. In accordance with the flight control information, the flying body 103 lands on the base station 102.

Note that the base station 102 may terminate imaging by the camera 112 in a case of causing the flying body 103 to land as described above. For example, when the base station 102 detects a trigger condition such as starting of the patrol car 101, acceleration of the patrol car 101 to a predetermined speed, and the starting preparation action of the patrol car 101 as described above on the basis of the vehicle information, the base station 102 transmits flight control information to the flying body 103 to cause the flying body 103 to land, and transmits imaging control information to the flying body 103 (camera 112) to terminate imaging by the camera 112.

In general, a moving speed of the flying body 103 (about 10 km/h to 20 km/h) is lower than a normal moving speed of the patrol car 101 (for example, about 40 km/h to 50 km/h). Therefore, it is difficult to move the patrol car 101 at the normal moving speed while causing the flying body 103 to fly. In other words, it is difficult to cause the flying body 103 to fly normally while the patrol car 101 is moving at the normal moving speed. That is, it becomes difficult for the camera 112 to perform imaging in a meaningful state, and even if imaging is performed, there is a high possibility that only a captured image that is unstable and difficult to use for patrol support can be obtained. That is, even if the flying body 103 is caused to fly to capture an image while the patrol car 101 is moving at the normal moving speed, a contribution degree to patrol support has been low, and conversely, there has been a possibility of reducing safety. Furthermore, there has been also a possibility that the flying body 103 is broken due to the unstable flight.

Therefore, by causing the flying body 103 to land on the base station 102 as described above in response to starting of the patrol car 101, the police officer 113 who drives the patrol car 101 can move the patrol car 101 more easily, safely, and at a high speed.

Note that, in this case, a captured image captured and generated by the camera 112 of the flying body 103 until an end of the imaging may be recorded at any place. For example, the base station 102 may record the captured image. Furthermore, the central control server 105 may record the captured image. Moreover, another device may record the captured image.

3. USE CASE 1-2 (ALTITUDE CONTROL)

Figure 11:
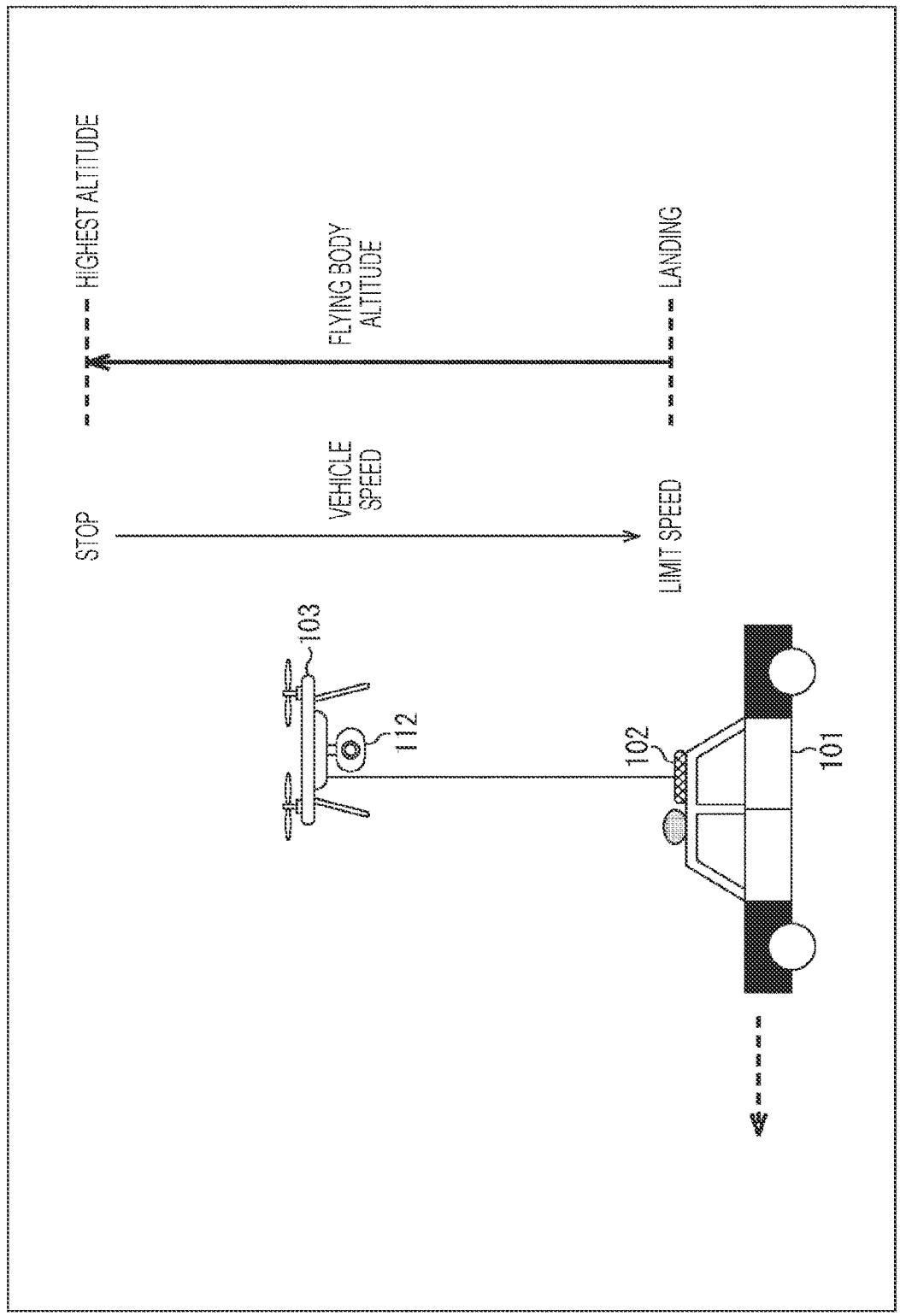
FIG. 11 is a view for explaining use case 1-2.

Furthermore, for example, as shown in FIG. 11, a flight altitude of the flying body 103 (flying body altitude) may be controlled (that is, an altitude of the camera 112 is controlled) in accordance with a moving speed (vehicle speed) of the patrol car 101. For example, the base station 102 may perform control so as to lower the flying body altitude as the vehicle speed is higher, and to increase the flying body altitude as the vehicle speed is lower.

For example, if the vehicle speed is sufficiently low (for example, about 20 km/h or less), it is possible to move while causing the flying body 103 to fly. However, as the vehicle speed increases, the flight of the flying body 103 tends to become unstable. Therefore, as described above, the base station 102 controls the flight altitude of the flying body in accordance with the vehicle speed, to lower the flying body altitude as the vehicle speed is higher, and to increase the flying body altitude as the vehicle speed is lower. For example, the base station 102 causes the flying body 103 to fly at a highest altitude in a case where the patrol car 101 is stopped, lowers the altitude of the flying body 103 as the moving speed of the patrol car 101 is higher, and causes the flying body 103 to land on the base station 102 when the speed of the patrol car 101 reaches a predetermined limit speed. Note that, when the flying body 103 is caused to land on the base station 102, the base station 102 may terminate imaging by the camera 112.

In such altitude control, for example, when the base station 102 detects a moving speed of the patrol car 101 on the basis of vehicle speed information included in vehicle information, the base station 102 generates flight control information for causing the flying body 103 to fly at an altitude corresponding to the moving speed, and transmits the flight control information to the flying body 103. The flying body 103 flies at an altitude designated by the flight control information.

By performing the altitude control in this way, the patrol support system 100 can cause the flying body 103 to fly more safely (perform imaging more safely) at more various vehicle speeds (moving speeds of the patrol car 101). That is, the patrol support system 100 can more appropriately perform patrol support under more various situations.

Note that, moreover, the altitude of the flying body 103 may be controlled on the basis of a flying body captured image (environment information) captured and generated by the camera 112. For example, in a case where the flying body captured image is analyzed and an obstacle such as a signal or a roof is detected, the flight altitude may be lowered in order to avoid the obstacle while flying. Note that, such altitude control of the flying body 103 based on the flying body captured image may be performed by the flying body 103 (camera 112) itself or may be performed by the base station 102.

Furthermore, the base station 102 may be able to control any parameter related to imaging, together with the flight altitude. For example, any parameter related to imaging may be controlled, such as imaging start/end, resolution, an aperture, sensitivity, a depth of field, an angle of view (zoom, pan, tilt), an orientation, image processing (such as white balance adjustment and filter processing), or the like.

Note that, in this case, a captured image captured and generated by the camera 112 of the flying body 103 until an end of the imaging may be recorded at any place. For example, the base station 102 may record the captured image. Furthermore, the central control server 105 may record the captured image. Moreover, another device may record the captured image.

4. USE CASE 2 (TAKE-OFF CONTROL)

Figure 12:
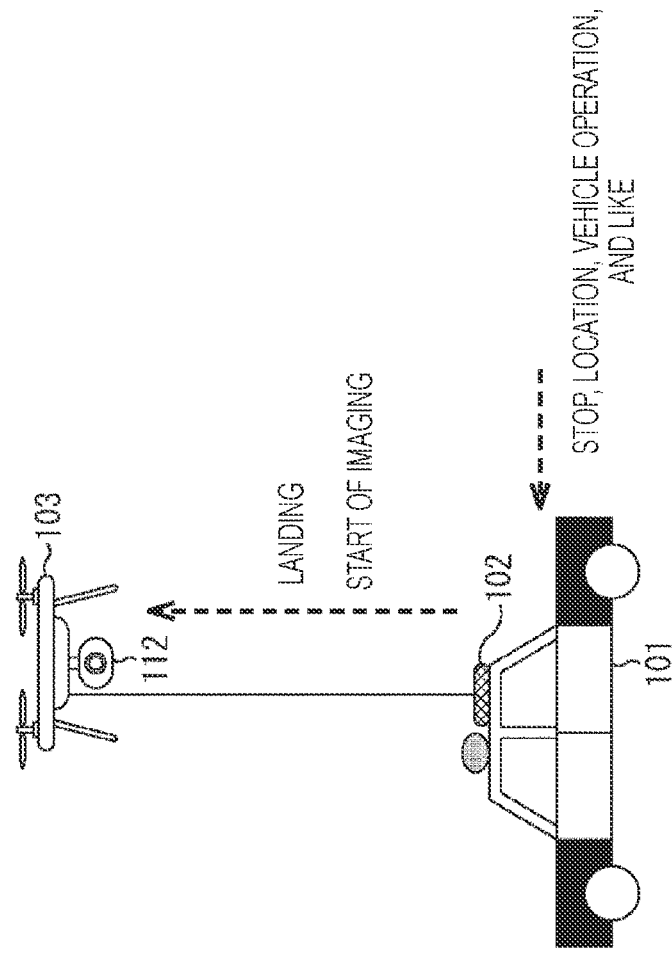
FIG. 12 is a view for explaining use case 2.

For example, as shown in FIG. 12, in an initial state, it is assumed that the patrol car 101 is moving and the flying body 103 has landed on the base station 102. In such a state, on the basis of an action, a situation, and the like around stopping of the patrol car 101, the base station 102 controls the flying body 103 to take off from the base station 102.

In a case where the police officer 113 who is a driver stops the patrol car 101 during patrol, there is a possibility that the police officer 113 performs some kind of activity. For example, it is conceivable that the police officer 113 gets off the patrol car 101 and transitions to patrol on foot, or performs police checkup on a suspicious person. Furthermore, it is also conceivable that the police officer 113 monitors the vicinity of the patrol car 101 from inside of the car. In order to support such an activity, the base station 102 causes the flying body 103 to take off in response to the stop of the patrol car 101, and causes the camera 112 to start imaging. Doing in such a way makes it possible to support the police officer 113 by using the flying body captured image generated in the camera 112. For example, surroundings of the patrol car 101 and the police officer 113 can be monitored using the flying body captured image, and the police officer 113 and the like can be notified of necessary information as appropriate. Furthermore, for example, the flying body captured image can be analyzed to detect an occurrence of abnormality, an appearance of a suspicious person, or the like, and the occurrence of abnormality, danger, or the like can be notified to the police officer 113. Moreover, for example, on the basis of the flying body captured image, it is possible to show the way or guide the police officer 113 or the patrol car 101. Furthermore, for example, a behavior of the police officer 113 can be monitored or recorded on the basis of the flying body captured image.

In such take-off control, the base station 102 may control the flying body 103 to take off from the base station 102 when the patrol car 101 stops (when the patrol car 101 decelerates to reach 0 km/h). In this case, when the base station 102 detects the stop of the patrol car 101 on the basis of, for example, vehicle speed information included in vehicle information, the base station 102 generates flight control information for causing the flying body 103 to take off from the base station 102 (a predetermined location), and transmits the flight control information to the flying body 103. The flying body 103 takes off from the base station 102 in accordance with the flight control information.

Furthermore, the base station 102 may control the flying body 103 to take off from the base station 102 when the started patrol car 101 decelerates to reach a predetermined speed or less (for example, 20 km/h or less, or the like). In this case, when the base station 102 detects that the speed of the patrol car 101 has decelerated to a predetermined speed or less on the basis of, for example, vehicle speed information included in vehicle information, the base station 102 generates flight control information for causing the flying body 103 to take off from the base station 102 (a predetermined location), and transmits the flight control information to the flying body 103. The flying body 103 takes off from the base station 102 in accordance with the flight control information.

Note that, in a case where the flying body 103 is caused to take off as described above, the base station 102 may cause the camera 112 to start imaging. For example, when the base station 102 detects a stop of the patrol car 101 or deceleration of the patrol car 101 to a predetermined speed or less as described above on the basis of the vehicle information, the base station 102 transmits flight control information to the flying body 103 to cause the flying body 103 to take off, and transmits imaging control information to the flying body 103 (camera 112) to start imaging by the camera 112.

Note that the police officer 113 may drive the patrol car 101 even in a case of not being on patrol. For example, there is a case where the police officer 113 drives the patrol car 101 to go to work from home or return home. Furthermore, for example, there may be a case where the police officer 113 moves by driving the patrol car 101 in a police station and the like. Moreover, there may be a case where the police officer 113 drives the patrol car 101 to have a meal during a break. Since these cases are not patrol, it is not necessary to cause the flying body 103 to fly to monitor the surroundings.

Therefore, only in a case where a condition indicating being on patrol is satisfied, the control may be performed so as to cause the flying body 103 to take off in response to a stop of the patrol car 101. The condition indicating being on patrol may be any condition. For example, in a case where the engine is not turned off (remains on) for a predetermined time (for example, several seconds) after the patrol car 101 is stopped, the base station 102 may control the flying body 103 to take off as described above.

Furthermore, for example, in a case where a door of the patrol car 101 is opened after the patrol car 101 is stopped, the base station 102 may control the flying body 103 to take off as described above. Moreover, for example, in a case where the patrol car 101 stops while turning on the rotating light, the base station 102 may control the flying body 103 to take off as described above.

Furthermore, for example, in a case where a stop location of the patrol car 101 is determined on the basis of vehicle location and position information (including a positioning result or the like using a GPS signal) of the vehicle information, and it is determined that the stop location of the patrol car 101 is a place other than a pre-registered place such as a police station or a home, for example, the base station 102 may control the flying body 103 to take off as described above.

Moreover, the base station 102 may cause the camera 112 to start imaging when causing the flying body 103 to take off as described above. Furthermore, the base station 102 may perform streaming distribution of a flying body captured image generated by the camera 112, to the central control server 105, for example. Moreover, the flying body captured image generated by the camera 112 may be recorded at any place. For example, the base station 102 may record the captured image. Furthermore, the central control server 105 may record the captured image. Moreover, another device may record the captured image.

Furthermore, the base station 102 may cause the flying body 103 having taken off to ascend to the highest altitude to monitor surroundings (capture an image of surroundings) of the patrol car 101. Then, in a case where the police officer 113 gets off the patrol car 101, the base station 102 may cause the flying body 103 having ascended to the highest altitude to descend and capture an image of surroundings of the police officer 113. Doing in such a way makes it possible to cause the flying body 103 to monitor surroundings of the patrol car 101 in a case where the police officer 113 is in the vehicle, and to monitor surroundings of the police officer 113 in a case where the police officer 113 gets off the vehicle. That is, imaging according to more various situations can be more easily performed. As a result, the patrol support system 100 can more appropriately support in more various situations.

Moreover, the base station 102 may control an angle of view and the like for imaging of a subject by the camera 112. For example, as described above, in a case of causing the flying body 103 having taken off to ascend to the highest altitude and monitor surroundings (capture an image of surroundings) of the patrol car 101, the base station 102 sets an angle of view of the camera 112 to a wide angle. Furthermore, in a case of capturing an image of surroundings of the police officer 113 by using the flying body 103, the base station 102 sets the angle of view of the camera 112 to a narrow angle. Doing in such a way enables imaging to be performed at an appropriate angle of view according to a subject. As a result, the patrol support system 100 can more appropriately support in more various situations.

Note that, although the control of the angle of view has been described above, the base station 102 can control any parameter related to imaging without limiting to the angle of view. For example, panoramic imaging, depth estimation, and stitching may be performed.

5. USE CASE 3 (TRACKING)

Figure 13:
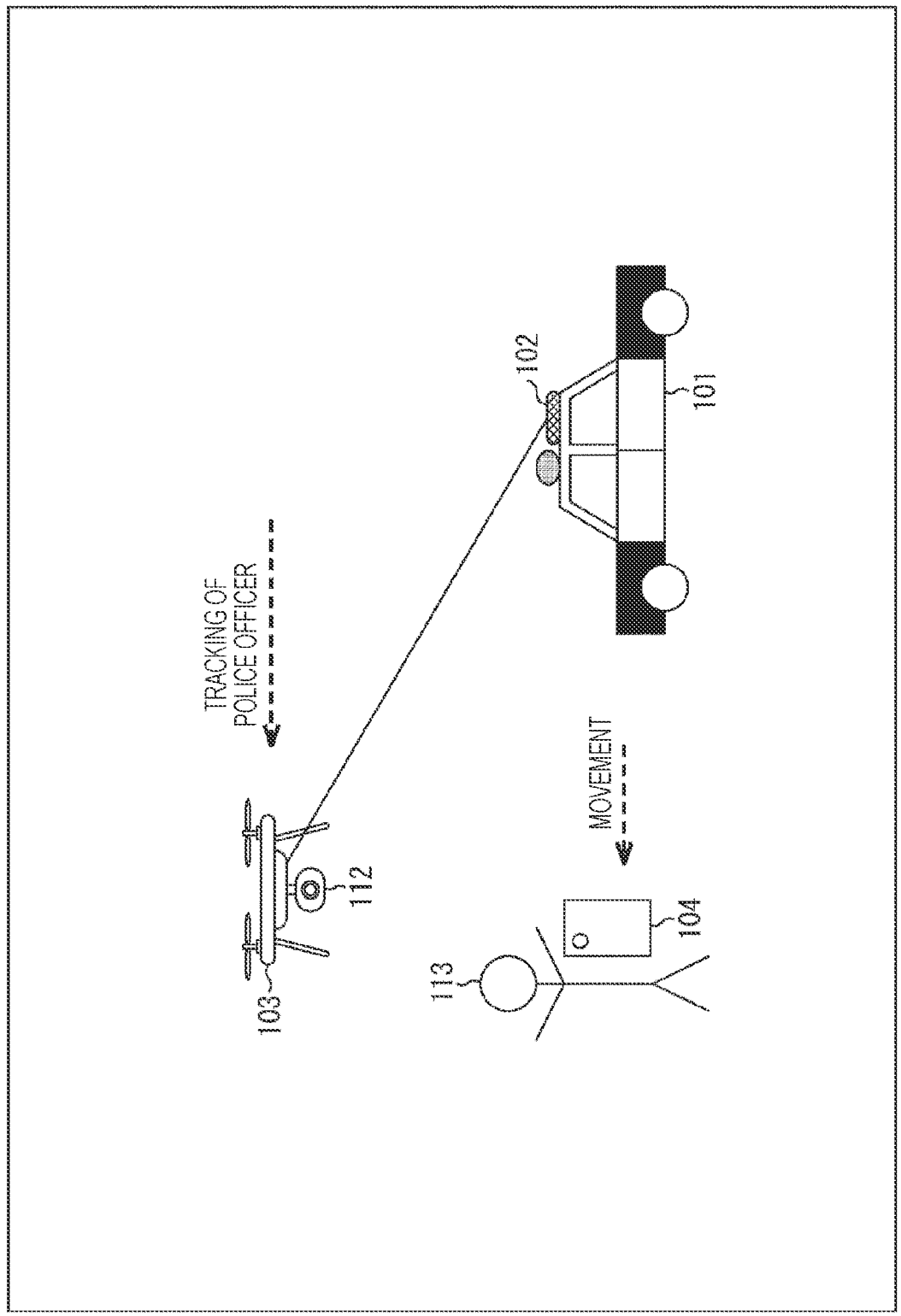
FIG. 13 is a view for explaining use case 3.

For example, as shown in FIG. 13, the base station 102 controls the flying body 103 to track the police officer 113 so as to capture an image of the police officer 113 who gets off the patrol car 101 and surroundings.

Doing in such a way allows the patrol support system 100 to support behavior monitoring and the like of the police officer 113, and to support safety management and the like of the police officer 113.

For example, the base station 102 determines (or estimates) a location of the police officer 113 in order to cause the flying body 103 to track the police officer 113. Any method may adopted for this. For example, a location of the police officer 113 may be derived from a GPS signal or the like by using the terminal device 104 carried by the police officer 113. Furthermore, the base station 102 determines whether or not the police officer 113 has gotten off the patrol car 101. For example, it may be determined whether or not the police officer 113 has gotten off the vehicle, on the basis of location information of the police officer 113 (terminal device 104) derived by the terminal device 104, detection of opening and closing of a door, an analysis result of a terminal captured image generated by the terminal device 104, or the like.

In such tracking control, the base station 102 may record a captured image when the patrol car 101 starts tracking. This recording may be performed in the base station 102, may be performed in the central control server 105, or may be performed in another device. Furthermore, streaming distribution of the captured image may be started. Furthermore, a bookmark may be inserted or metadata may be added to the captured image, together with the start of tracking. Note that, such an event may be triggered in a case where the police officer 113 tracked by the flying body 103 uses a weapon (for example, when a gun is removed from a holder, and the like).

Moreover, the base station 102 may control an angle of view of imaging. For example, any parameters related to imaging by the camera 112, such as an angle of view (zoom, pan, tilt, or the like), a location, an orientation, an inclination, and a height, may be controlled.

Furthermore, for example, when the flying body 103 tracks the police officer 113, the camera 112 may capture an image at a location or in a position in which a line-of-sight direction of the police officer 113 is widened in the captured image. In other words, the base station 102 may control flight of the flying body 103 such that the camera 112 can perform such imaging. Doing in such a way enables intensive monitoring of the line-of-sight direction of the police officer 113.

Furthermore, for example, the camera 112 may capture an image at a location or in a position in which the police officer 113 is located at an image center in the captured image. In other words, the base station 102 may control flight of the flying body 103 such that the camera 112 can perform such imaging. Doing in such a way makes it possible to perform monitoring without causing deviation depending on the direction.

Furthermore, for example, the camera 112 may capture an image at a location or in a position in which a direction opposite to the line-of-sight direction of the police officer 113 is widened in the captured image. Doing in such a way makes it possible to widely monitor the direction opposite to the line-of-sight direction of the police officer 113 (a back side of the head of the police officer 113). Therefore, the safety of the police officer 113 can be improved.

Furthermore, for example, the camera 112 may capture an image at a location or in a position in which a direction of a weapon of the police officer 113 is widened in the captured image. Doing in such a way enables wide monitoring in a direction in which the police officer 113 points the weapon. Therefore, a behavior of the police officer 113 can be managed more accurately.

Furthermore, for example, in a case where a sudden sound such as a gunshot sound occurs, the base station 102 may direct the camera 112 toward a sound source to capture an image. Doing in such a way allows the flying body 103 (camera 112) to capture an image in a direction in which an abnormality has occurred.

<6. Use Case 4 (Surrounding Monitoring)>

Figure 14:
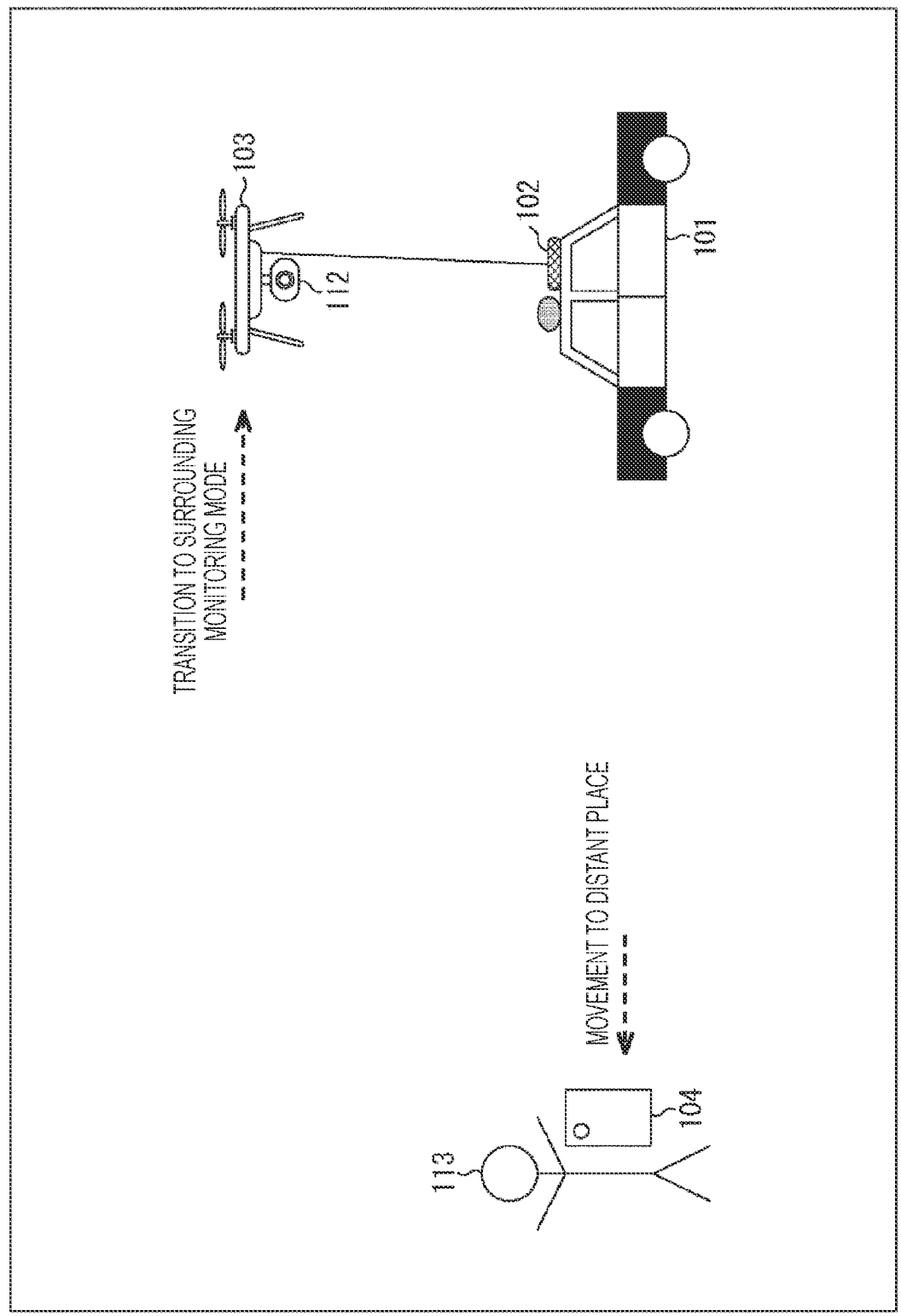
FIG. 14 is a view for explaining use case 4.

For example, as shown in FIG. 14, the base station 102 controls the flying body 103 to fly so as to capture an image of surroundings of the patrol car 101. For example, in a case where the police officer 113 moves away from the patrol car 101 to an extent where tracking is disabled, the base station 102 ends the tracking of the police officer 113, and causes the flying body 103 to fly around the patrol car 101 and perform monitoring.

Doing in such a way allows the patrol support system 100 to monitor surroundings of the patrol car 101 and detect an abnormality occurring around the patrol car 101.

For example, the base station 102 causes the flying body 103 to fly at a constant height, and further, rotates the flying body 103 (or the camera 112) to capture images in all directions (360 degrees). An angle of view may be a wide angle or a narrow angle. By using the captured images in all directions generated in this way, abnormality detection and suspicious person detection are performed. Doing in such a way allows the base station 102 to appropriately monitor surroundings of the patrol car 101.

Furthermore, this captured image may be recorded. For example, the base station 102 or the central control server 105 may record the captured image. Furthermore, another device may record the captured image.

Note that a plurality of microphones may be provided to the flying body 103, and sound around the patrol car 101 may be recorded by the plurality of microphones. For example, the base station 102 may identify a sound generation direction on the basis of the collected sound, and control the flying body 103 to direct the camera 112 toward the sound generation direction (capture an image in the sound generation direction).

As described above, by applying the present technology, a subject can be more easily imaged by an appropriate method in each use case. That is, imaging according to more various situations can be more easily performed.

7. SUPPLEMENTARY NOTE

Application Example

Figure 15:
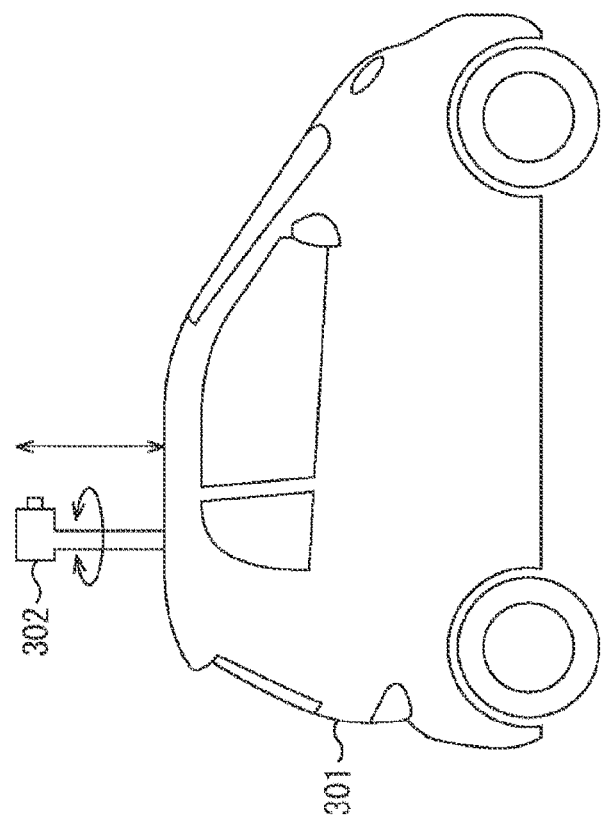
FIG. 15 is a view showing an example of a camera installed on a pole-shaped installation base mounted on an automobile.

Note that, in the above description, it has been described that the imaging device includes the camera 112 as an imaging function unit that images a subject, and the flying body 103 as an imaging range varying unit that varies a range of the imaging (controls an imaging range) by the imaging function unit. However, each of the imaging function unit and the imaging range variable unit may have any configuration. For example, the imaging range variable unit is not limited to the flying body, and may be an automobile, a ship, or the like. That is, the imaging range variable unit may be any mobile body. Furthermore, the imaging range variable unit may be a drive unit capable of controlling a position or the like of the imaging function unit. For example, as shown in FIG. 15, the imaging function unit may be a camera 302 installed on a pole-shaped installation base mounted on an automobile 301, and the imaging range variable unit may be the installation base and the drive unit (not illustrated) configured to control an orientation, a height, and the like of the camera 302. This pole-shaped installation base has a movable portion that can expand and contract, rotate, and the like, and the drive unit can control a location and an orientation of the camera 302 by driving the movable portion. For example, the drive unit can store the camera 302 in a storage unit for the camera 302 of the automobile 301 by shortening the installation base, extend the installation base as shown in FIG. 15 so that the camera 302 projects upward from the automobile 301, and rotate the installation base about a longitudinal direction thereof to control an orientation of the camera 302. Furthermore, the imaging function unit is not limited to a sensor configured to detect visible light, and may be any sensor. For example, the imaging function unit may be a sensor configured to detect invisible light such as infrared light or ultraviolet light, or may be a sensor configured to detect sound.

Furthermore, in the above description, the patrol car 101 has been described as an example of a vehicle, but this is an example, and the vehicle may not be the patrol car. For example, the vehicle may be an ambulance, a fire engine, a truck, or the like. Furthermore, the vehicle need not be such a special vehicle or a large vehicle, and may be a general vehicle (ordinary vehicle), for example. Furthermore, the above-described "vehicle" that generates vehicle information is not limited to an automobile. For example, a ship, an aircraft, a train (including a steam train), and the like are also included in the "vehicle".

<Computer>

The series of processes described above can be executed by hardware or also executed by software. In a case where the series of processes are performed by software, a program that configures the software is installed in a computer. Here, examples of the computer include, for example, a computer that is built in dedicated hardware, a general-purpose personal computer that can perform various functions by being installed with various programs, and the like.

Figure 16:
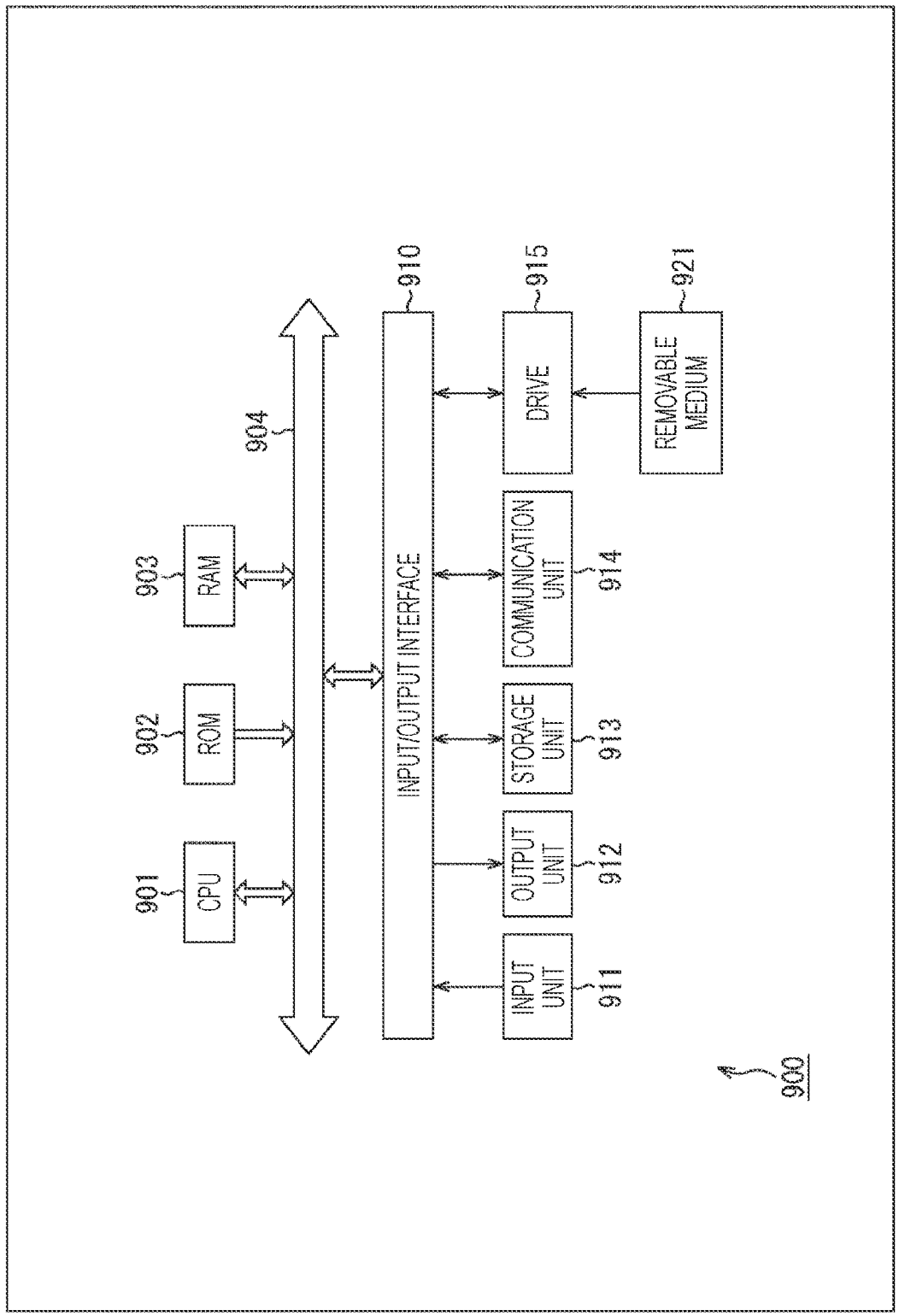
FIG. 16 is a block diagram showing a main configuration example of a computer.

FIG. 16 is a block diagram showing a configuration example of hardware of a computer that executes the series of processes described above in accordance with a program.

In a computer 900 shown in FIG. 16, a central processing unit (CPU) 901, a read only memory (ROM) 902, and a random access memory (RAM) 903 are mutually connected via a bus 904.

The bus 904 is further connected with an input/output interface 910. To the input/output interface 910, an input unit 911, an output unit 912, a storage unit 913, a communication unit 914, and a drive 915 are connected.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface or the like. The drive 915 drives a removable medium 921 such as a magnetic disk, an optical disk, a magneto-optical disk, or a semiconductor memory.

In the computer configured as described above, the series of processes described above are performed, for example, by the CPU 901 loading a program recorded in the storage unit 913 into the RAM 903 via the input/output interface 910 and the bus 904, and executing. The RAM 903 also appropriately stores data necessary for the CPU 901 to execute various processes, for example.

The program executed by the computer can be applied by being recorded on, for example, the removable medium 921 as a package medium or the like. In this case, by attaching the removable medium 921 to the drive 915, the program can be installed in the storage unit 913 via the input/output interface 910.

Furthermore, the program can also be provided via a wired or wireless transmission medium such as a local area network, the Internet, or digital satellite broadcasting. In this case, the program can be received by the communication unit 914 and installed in the storage unit 913.

Besides, the program can be installed in advance in the ROM 902 and the storage unit 913.

<Applicable Target of Present Technology>

Furthermore, the present technology can be applied to any configuration. For example, the present technology can also be implemented as a partial configuration of a device such as: a processor (for example, a video processor) as a system large scale integration (LSI) or the like; a module (for example, a video module) using a plurality of processors or the like; a unit (for example, a video unit) using a plurality of modules or the like; or a set (for example, a video set) in which other functions are further added to the unit.

Furthermore, for example, the present technology can also be applied to a network system including a plurality of devices. For example, the present technology may be implemented as cloud computing that performs processing in sharing and in cooperation by a plurality of devices via a network. For example, for any terminal such as a computer, an audio visual (AV) device, a portable information processing terminal, or an Internet of Things (IoT) device, the present technology may be implemented in a cloud service that provides a service related to an image (moving image).

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

<Field and Application to which Present Technology is Applicable>

A system, a device, a processing unit, and the like to which the present technology is applied can be utilized in any field such as, for example, transportation, medical care, crime prevention, agriculture, a livestock industry, a mining industry, beauty care, a factory, a household electric appliance, weather, nature monitoring, and the like.

Furthermore, any application thereof may be adopted.

<Others>

The embodiment of the present technology is not limited to the above-described embodiment, and various modifications can be made without departing from the scope of the present technology.

For example, a configuration described as one device (or processing unit) may be divided and configured as a plurality of devices (or processing units). On the contrary, a configuration described above as a plurality of devices (or processing units) may be collectively configured as one device (or processing unit). Furthermore, as a matter of course, a configuration other than the above may be added to a configuration of each device (or each processing unit). Moreover, as long as a configuration and an action of the entire system are substantially the same, a part of a configuration of one device (or processing unit) may be included in a configuration of another device (or another processing unit).

Furthermore, for example, the above-described program may be executed in any device. In that case, the device is only required to have a necessary function (a functional block or the like) such that necessary information can be obtained.

Furthermore, for example, individual steps of one flowchart may be executed by one device, or may be shared and executed by a plurality of devices. Moreover, in a case where one step includes a plurality of processes, the plurality of processes may be executed by one device or may be shared and executed by a plurality of devices. In other words, a plurality of processes included in one step can be executed as a plurality of steps. On the contrary, a process described as a plurality of steps can be collectively executed as one step.

Furthermore, for example, in the program executed by the computer, processing of steps describing the program may be executed in chronological order in the order described in this specification, or may be executed in parallel or individually at a required timing such as when a call is made. That is, as long as no contradiction occurs, processing of each step may be executed in an order different from the order described above. Moreover, this processing of steps describing program may be executed in parallel with processing of another program, or may be executed in combination with processing of another program.

Furthermore, for example, a plurality of techniques related to the present technology can be implemented independently as a single body as long as there is no contradiction. Of course, any of the plurality of present technologies can be used in combination. For example, a part or all of the present technology described in any embodiment can be implemented in combination with a part or all of the present technology described in another embodiment. Furthermore, a part or all of the present technology described above may be implemented in combination with another technology not described above.

Note that the present technology can also have the following configurations.

(1) An information processing apparatus including:
a control unit configured to control an imaging device, the imaging device including an imaging function unit and an imaging range variable unit, on the basis of vehicle information that is information regarding a vehicle.

(2) The information processing apparatus according to (1), in which
the control unit controls imaging by the imaging function unit, on the basis of the vehicle information.

(3) The information processing apparatus according to (2), in which
the control unit controls an angle of view of the imaging, a start or an end of the imaging, or a start or an end of transmission of a captured image generated by the imaging.

(4) The information processing apparatus according to any one of (1) to (3), in which
the imaging range variable unit is a mobile body, and
the control unit controls movement of the mobile body on the basis of the vehicle information.

(5) The information processing apparatus according to (4), in which
the mobile body is a flying body, and
the control unit controls flight of the flying body on the basis of the vehicle information.

(6) The information processing apparatus according to (5), in which the control unit controls a location, a height, an orientation, an inclination, or a motion of the flying body.

(7) The information processing apparatus according to any one of (1) to (6), in which
the vehicle information includes vehicle location and position information that is information regarding a location and a position of the vehicle.

(8) The information processing apparatus according to any one of (1) to (7), in which
the vehicle information includes vehicle speed information that is information regarding a speed of the vehicle.

(9) The information processing apparatus according to any one of (1) to (8), in which
the vehicle information includes vehicle operation information that is information regarding a user operation for the vehicle.

(10) The information processing apparatus according to any one of (1) to (9), in which
the vehicle information includes vehicle attached equipment information that is information regarding attached equipment of the vehicle.

(11) The information processing apparatus according to any one of (1) to (10), in which
the control unit controls the imaging device, further on the basis of environment information that is information regarding surroundings of the vehicle.

(12) The information processing apparatus according to (11), in which
the environment information includes a captured image generated by the imaging function unit, or includes an analysis result of the captured image.

(13) The information processing apparatus according to (11), in which
the environment information includes a captured image generated by another imaging device different from the imaging device, or includes an analysis result of the captured image.

(14) The information processing apparatus according to any one of (1) to (13), in which
the imaging range variable unit is a flying body, and
the control unit controls the flying body to cause the imaging device to land at a predetermined location, in a case where a speed of the vehicle reaches a predetermined speed or more.

(15) The information processing apparatus according to any one of (1) to (14), in which
the imaging range variable unit is a flying body, and
the control unit controls an altitude of the imaging device by controlling the flying body in accordance with a speed of the vehicle.

(16) The information processing apparatus according to any one of (1) to (15), in which
the imaging range variable unit is a flying body, and
the control unit controls the flying body and causes the imaging device to take off in a case where the vehicle stops.

(17) The information processing apparatus according to any one of (1) to (16), in which
the imaging range variable unit is a flying body, and
in a case where a user of the vehicle gets off, the control unit controls the flying body to cause the imaging device to track the user.

(18) The information processing apparatus according to any one of (1) to (17), in which
the imaging range variable unit is a flying body, and
the control unit controls the flying body to cause the imaging function unit to capture an image of surroundings of the vehicle, in a case where a user is away from the vehicle by a predetermined distance.

(19) An information processing method including:
controlling an imaging device, the imaging device including an imaging function unit and an imaging range variable unit, on the basis of vehicle information that is information regarding a vehicle.

(20) A program for causing a computer to function as:
a control unit configured to control an imaging device, the imaging device including an imaging function unit and an imaging range variable unit, on the basis of vehicle information that is information regarding a vehicle.

REFERENCE SIGNS LIST

100 Patrol support system
101 Patrol car
102 Base station
103 Flying body
104 Terminal device
105 Central control server
111 Cable
112 Camera
113 Police officer
114 Network
131 Vehicle unit
132 Vehicle information generation unit
133 Communication unit 141 Vehicle information acquisition unit
142 Environment information acquisition unit
143 Control unit
144 Communication unit
151 Flight control unit
152 Imaging control unit
153 Vehicle control unit
154 Terminal control unit
155 Server processing unit
161 Flight unit
162 Imaging unit
163 Environment information generation unit
164 Streaming processing unit
165 Communication unit
171 Imaging unit
172 Sensor unit
173 Streaming processing unit
174 Environment information generation unit
175 Communication unit
181 Instruction command generation unit
182 Streaming processing unit
183 Communication unit

The invention claimed is:

1. An information processing apparatus, comprising:
a processor configured to:
   control an imaging operation of a first imaging device based on vehicle information regarding a vehicle, wherein
      the first imaging device includes an imaging function unit and an imaging range variable unit,
      the imaging range variable unit is a flying body, and
      the vehicle information includes vehicle operation information regarding a user operation on the vehicle, vehicle attached equipment information regarding attached equipment of the vehicle, and vehicle speed information that is information regarding a speed of the vehicle; and
   control, the flying body to cause the first imaging device to land at a predetermined location and terminate the imaging operation, in a case where the speed of the vehicle reaches a specific speed or more.

2. The information processing apparatus according to claim 1, wherein
the processor is further configured to control one of an angle of view of the imaging operation, a start of the imaging operation, or a start or an end of transmission of a captured image generated by the imaging operation.

3. The information processing apparatus according to claim 1, wherein
the processor is further configured to control flight of the flying body based on the vehicle information.

4. The information processing apparatus according to claim 3, wherein
the processor is further configured to control one of a location, a height, an orientation, an inclination, or a motion of the flying body.

5. The information processing apparatus according to claim 1, wherein
the vehicle information further includes at least one of vehicle location or position information that is information regarding a location and a position of the vehicle.

6. The information processing apparatus according to claim 1, wherein the processor is further configured to control the first imaging device, further based on environment information that is information regarding surroundings of the vehicle.

7. The information processing apparatus according to claim 6, wherein
the environment information includes one of a captured image generated by the imaging function unit or an analysis result of the captured image.

8. The information processing apparatus according to claim 6, wherein
the environment information includes one of a captured image generated by a second imaging device different from the first imaging device or an analysis result of the captured image.

9. The information processing apparatus according to claim 1, wherein
the processor controls an altitude of the first imaging device by controlling the flying body in accordance with a speed of the vehicle.

10. The information processing apparatus according to claim 1, wherein
the processor controls the flying body and causes the first imaging device to take off in a case where the vehicle stops.

11. The information processing apparatus according to claim 1, wherein
in a case where a user of the vehicle gets off, the processor controls the flying body to cause the first imaging device to track the user.

12. The information processing apparatus according to claim 1, wherein
the processor controls the flying body to cause the imaging function unit to capture an image of surroundings of the vehicle, in a case where a user is away from the vehicle by a predetermined distance.

13. The information processing apparatus according to claim 1, wherein
the processor is further configured to control the first imaging device, further based on environment information that is information regarding user surroundings, and
the environment information includes images generated by the imaging function unit, user operations, and user biological conditions.

14. The information processing apparatus according to claim 1, wherein the vehicle operation information includes information indicating at least one of: a state of an engine of the vehicle, a state of an ignition key of the vehicle, a state of a door of the vehicle, an accelerator opening degree of the vehicle, a state of a brake pedal of the vehicle, a state of a steering wheel of the vehicle, or a state of a shift lever of the vehicle.

15. An information processing method, comprising:
controlling an imaging operation of an imaging device based on vehicle information regarding a vehicle, wherein
   the imaging device includes an imaging function unit and an imaging range variable unit,
   the imaging range variable unit is a flying body, and
   the vehicle information includes vehicle operation information regarding a user operation on the vehicle, vehicle attached equipment information regarding attached equipment of the vehicle, and vehicle speed information that is information regarding a speed of the vehicle; and controlling, the flying body to cause the imaging device to land at a predetermined location and terminate the imaging operation, in a case where the speed of the vehicle reaches a specific speed or more.

16. A non-transitory computer-readable medium having stored thereon computer-executable instructions, which when executed by a computer, cause the computer to execute operations, the operation comprising:

controlling an imaging operation of an imaging device based on vehicle information regarding a vehicle, wherein the imaging device includes an imaging function unit and an imaging range variable unit, the imaging range variable unit is a flying body, and the vehicle information includes vehicle operation information regarding a user operation on the vehicle, vehicle attached equipment information regarding attached equipment of the vehicle, and vehicle speed information that is information regarding a speed of the vehicle; and controlling, the flying body to cause the imaging device to land at a predetermined location and terminate the imaging operation, in a case where the speed of the vehicle reaches a specific speed or more.

* * * * *